(12) United States Patent
Fukumoto et al.

(10) Patent No.: US 9,596,335 B2
(45) Date of Patent: Mar. 14, 2017

(54) COMMUNICATION TERMINAL AND COMMUNICATION METHOD

(71) Applicant: NEC Corporation, Tokyo (JP)

(72) Inventors: Takaya Fukumoto, Tokyo (JP); Junichi Kumazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/781,802

(22) PCT Filed: Mar. 28, 2014

(86) PCT No.: PCT/JP2014/059227
§ 371 (c)(1),
(2) Date: Oct. 1, 2015

(87) PCT Pub. No.: WO2014/168030
PCT Pub. Date: Oct. 16, 2014

(65) Prior Publication Data
US 2016/0021231 A1    Jan. 21, 2016

(30) Foreign Application Priority Data
Apr. 11, 2013 (JP) ................................. 2013-082807

(51) Int. Cl.
*H04B 7/00* (2006.01)
*H04M 1/725* (2006.01)
(Continued)

(52) U.S. Cl.
CPC ...... *H04M 1/72519* (2013.01); *G06F 3/0481* (2013.01); *G06F 3/04883* (2013.01);
(Continued)

(58) Field of Classification Search
CPC .............................. H04W 4/08; H04L 67/1044
(Continued)

(56) References Cited

U.S. PATENT DOCUMENTS 7,725,509 B2 * 5/2010 Raff .................. H04L 29/06
707/639
8,200,841 B2 * 6/2012 Kudo ................ H04L 29/12537
709/238
(Continued)

FOREIGN PATENT DOCUMENTS

EP    1921855 A2    5/2008
EP    2019538 A2    1/2009
(Continued)

OTHER PUBLICATIONS

International Search Report, Corresponding to PCT/JP2014/059227, dated Jun. 24, 2014, 2 pages.
(Continued)

*Primary Examiner* — Sonny Trinh
(74) *Attorney, Agent, or Firm* — Wilmer Cutler Pickering Hale and Dorr LLP

(57) ABSTRACT

A communication terminal (100) includes a type identifying unit (102) that identifies a type of user-to-user communication means corresponding to a user's operation which is detected by an operation detection unit (101), a data acquisition unit (103) that acquires communication media data of a user of the communication terminal itself, corresponding to the identified type of user-to-user communication means, and a transmission unit (104) that transmits type request information indicating the type of user-to-user communication means and the communication media data to a partner communication terminal, and the type identifying unit (102) determines a range of types of user-to-user communication means to which switching is allowed from a type of current user-to-user communication means, in accordance with a status of response from the partner communication terminal with respect to the type request information transmitted to the partner communication terminal.

16 Claims, 17 Drawing Sheets

(51) Int. Cl.
    *G06F 3/0488*     (2013.01)
    *G06F 3/0481*     (2013.01)

(52) U.S. Cl.
    CPC ............. *G06F 2203/04808* (2013.01); *H04M 2250/22* (2013.01)

(58) Field of Classification Search
    USPC ............... 455/518, 519, 437, 445, 509, 516; 709/238
    See application file for complete search history.

(56) References Cited

U.S. PATENT DOCUMENTS

| | | | | |
|---|---|---|---|---|
| 8,433,821 | B2 * | 4/2013 | Kudo | ................ H04L 29/12509 370/315 |
| 2003/0142200 | A1 | 7/2003 | Canova et al. | |
| 2005/0271062 | A1 | 12/2005 | Ezumi et al. | |
| 2009/0029694 | A1 | 1/2009 | Kano et al. | |

FOREIGN PATENT DOCUMENTS

| | | | |
|---|---|---|---|
| JP | 10-178671 | A | 6/1988 |
| JP | 02-060363 | A | 2/1990 |
| JP | 05-083413 | A | 4/1993 |
| JP | 11-225220 | A | 8/1999 |
| JP | 2009-033255 | A | 2/2009 |
| WO | WO-03/065702 | A1 | 8/2003 |

OTHER PUBLICATIONS

Extended European Search Report issued in corresponding European Patent Application No. 14782165.6, dated Nov. 8, 2016, 8 pages.

* cited by examiner

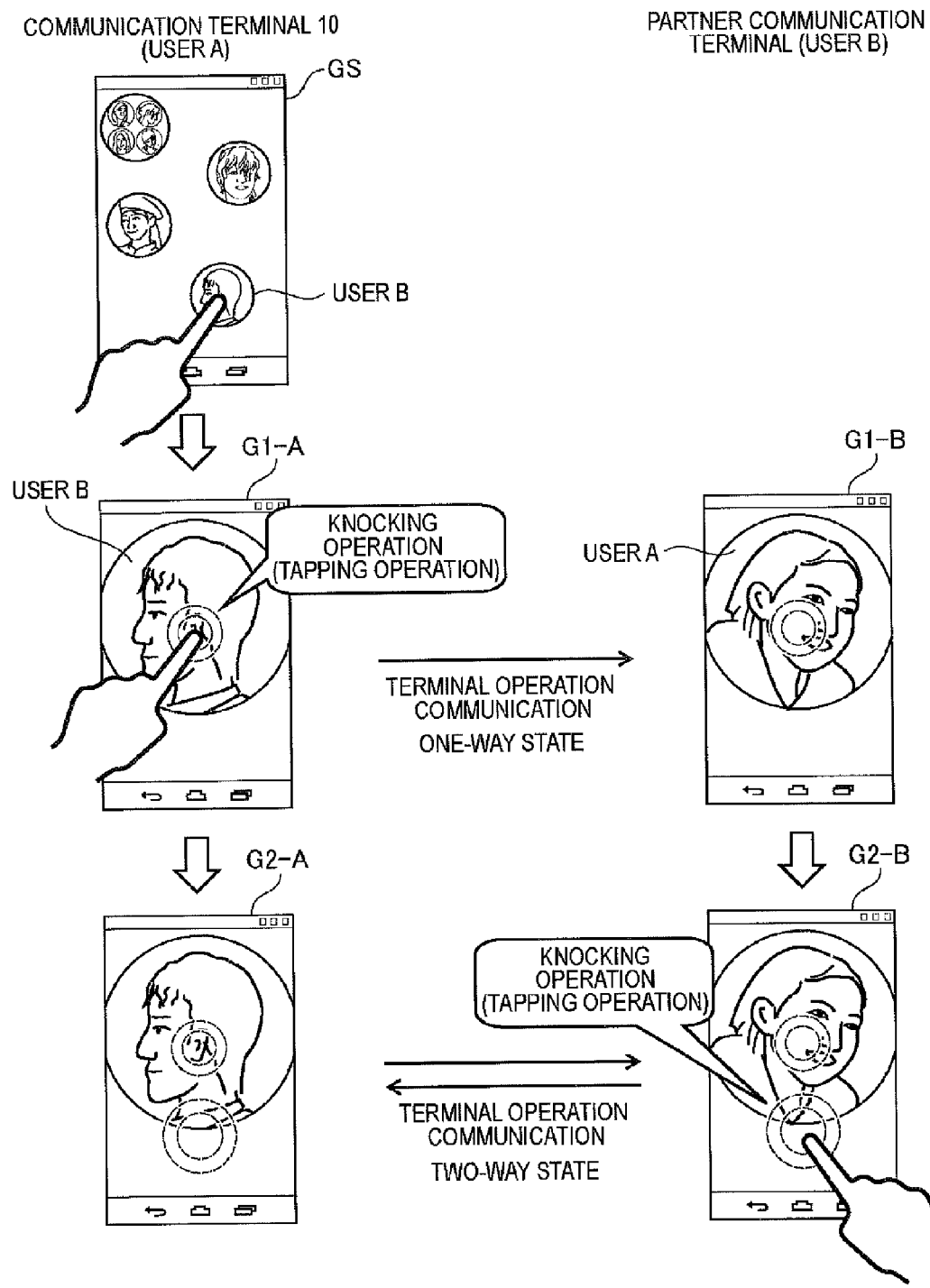

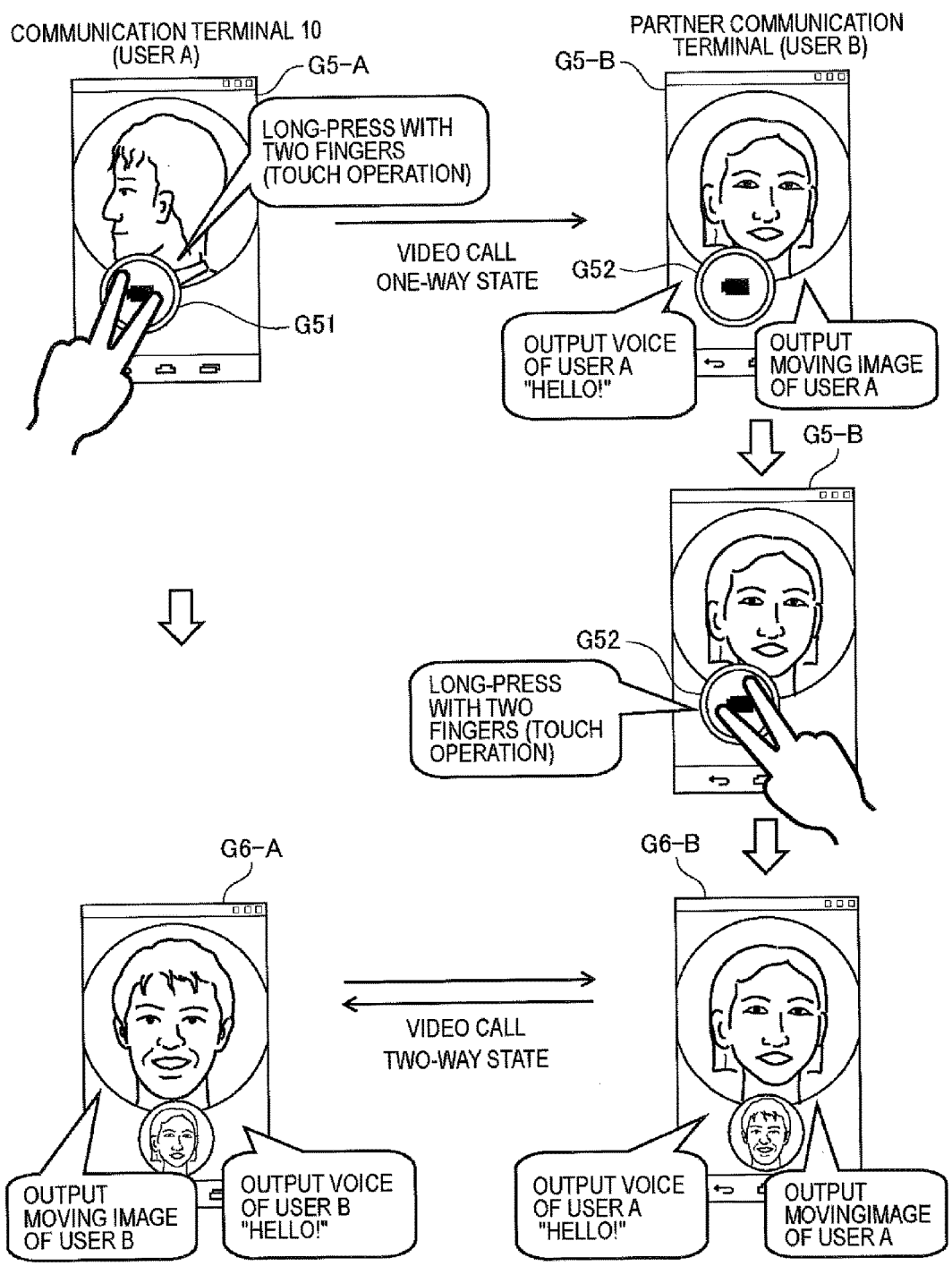

FIG. 8D
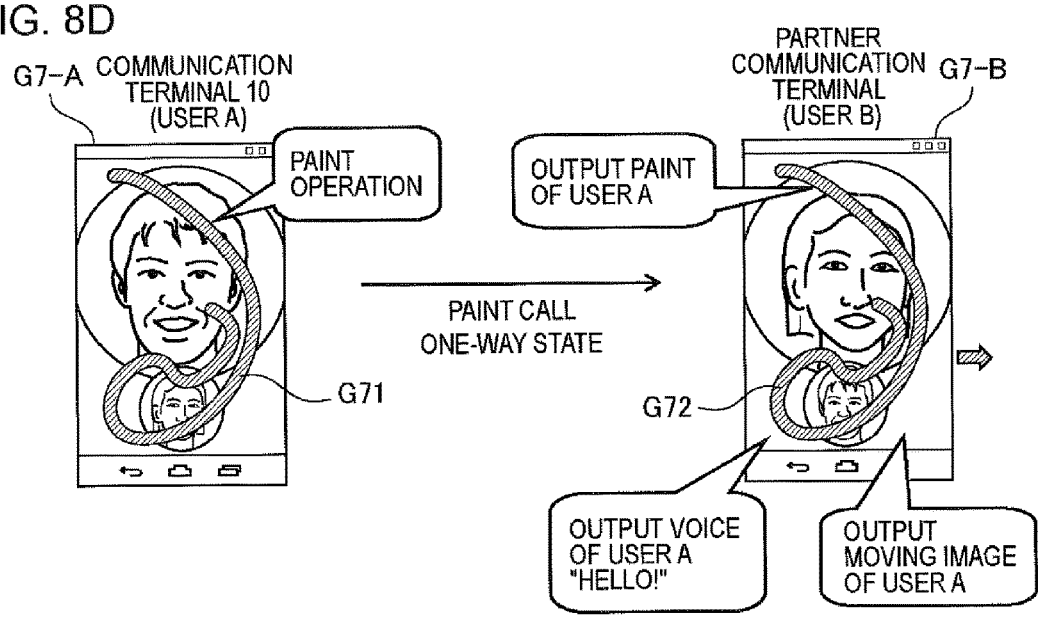
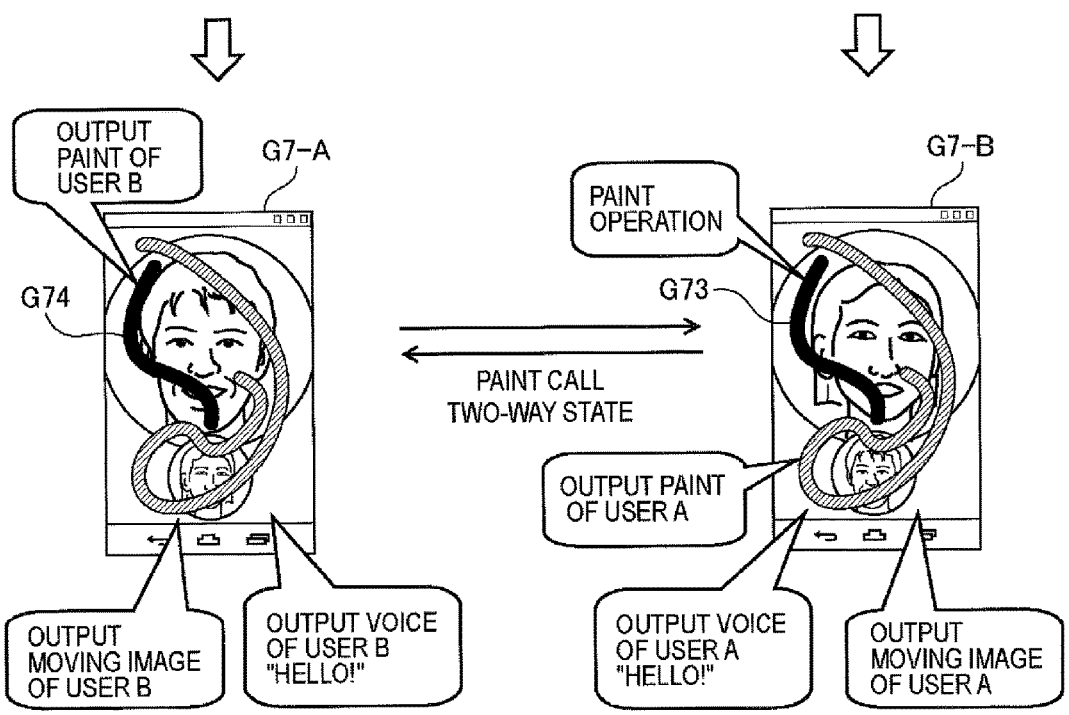

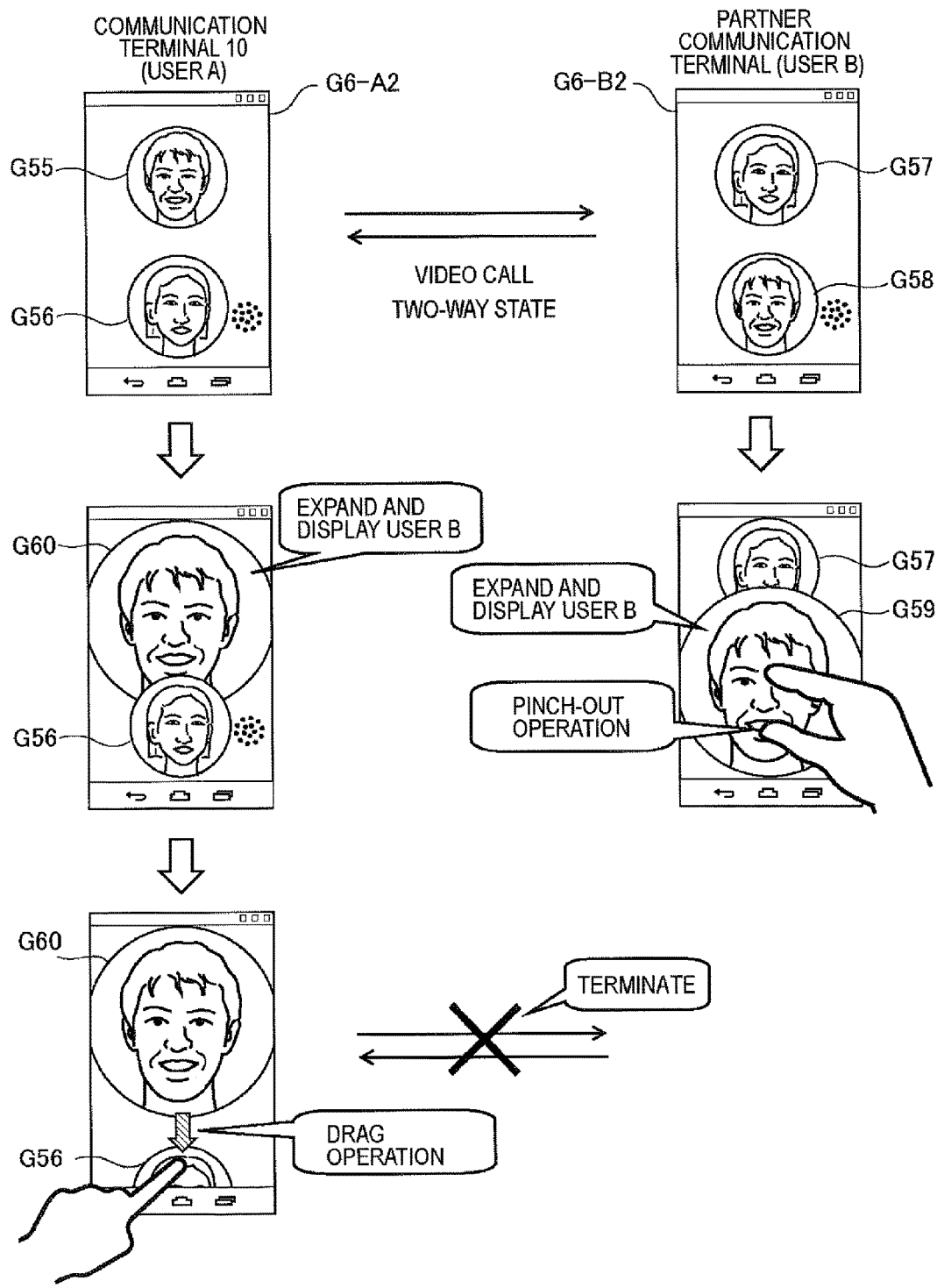

COMMUNICATION TERMINAL AND COMMUNICATION METHOD

CROSS-REFERENCE TO RELATED APPLICATIONS

The present application is a national stage application of International Application No. PCT/JP 2014/059227 entitled "Communication Terminal and Communication Method," filed on Mar. 28, 2014, which claims the benefit of priority from Japanese Patent Application No. JP2013-082807, filed on Apr. 11, 2013, the disclosures of which are incorporated herein their entirety by reference thereto.

TECHNICAL FIELD

The present invention relates to a user-to-user communication technique using communication terminals.

BACKGROUND ART

At present, in communication terminals such as a personal computer (PC), a cellular phone, and a smartphone, user-to-user communication is performed by various communication means. Examples of the communication means include e-mail, a voice call, a video call, chatting, and the like. Users start user-to-user communication by identifying desired communication means. In this manner, current communication terminals determine the type of communication means in advance of the start of user-to-user communication. Thus, there is a problem in that the current communication terminals are not able to switch the type of communication means without terminating the user-to-user communication.

Consequently, the following Patent Document 1 proposes a method that enables to switch the type of communication while continuing communication. Specifically, in the following Patent Document 1, a terminal device, which has received a request for a change in the type of communication from a user in a communication phase after the beginning of the communication, performs transmission control by adding data for requesting switching of the communication type to control data (SA of TCH data). The terminal device, which has received the switching request, performs switching control so that communication according to the request can be performed, when the data for requesting switching of a communication type is included in a received signal in the communication phase.

RELATED DOCUMENT

Patent Document

[Patent Document 1] Japanese Unexamined Patent Publication No. 10-178671

SUMMARY OF THE INVENTION

Problem to be Solved by the Invention

However, the above-mentioned proposed method targets at nothing other than switching between voice communication and bearer communication, that is, switching between communication modes, and does not take into consideration the usability of user-to-user communication means. At present when there are multiple types of communication means regardless of communication modes used by the communication means, the easiness of switching operations of these communication means is important to a user. The usability of the communication means is related to not only a switching operation, but also an operational feeling of the communication means itself in each situation of a person who makes a request and a person who receives the request.

The present invention has been made in view of the circumstances described above, and provides a technique that provides a technique for improving the usability of user-to-user communication means using communication terminals.

Means for Solving the Problem

In each aspect of the present invention, each of the following configurations is adopted in order to solve the above-mentioned problems.

A first aspect relates to a communication terminal. The communication terminal according to the first aspect includes an operation detection unit that detects a user's operation to the communication terminal itself, a type identifying unit that identifies a type of user-to-user communication means corresponding to the user's operation which is detected by the operation detection unit, from types of user-to-user communication means to which switching is allowed from a type of current user-to-user communication means which is currently used, among plural types of user-to-user communication means capable of being implemented using communication between a partner communication terminal and the communication terminal itself, a data acquisition unit that acquires communication media data of a user of the communication terminal itself, which corresponds to the type of user-to-user communication means identified by the type identifying unit, and a transmission unit that transmits type request information indicating the type of user-to-user communication means identified by the type identifying unit and the communication media data acquired by the data acquisition unit, to the partner communication terminal. Further, the type identifying unit determines a range of the types of user-to-user communication means to which switching is allowed from the type of current user-to-user communication means, in accordance with a status of response from the partner communication terminal with respect to the type request information transmitted to the partner communication terminal.

A second aspect relates to a communication method which is executed by a communication terminal. The communication method according to the second aspect includes detecting a user's operation to the communication terminal, identifying a type of user-to-user communication means corresponding to the detected user's operation, from types of user-to-user communication means to which switching is allowed from a type of current user-to-user communication means which is currently used, among plural types of user-to-user communication means capable of being implemented using communication between a partner communication terminal and the communication terminal, acquiring communication media data of a user of the communication terminal, which corresponds to the identified type of user-to-user communication means, and transmitting type request information indicating the identified type of user-to-user communication means and the acquired communication media data, to the partner communication terminal. Further, the identifying of the type of user-to-user communication means includes determining a range of the types of user-to-user communication means to which switching is allowed from the type of current user-to-user communication means, in accordance with a status of response from the partner communication terminal with respect to the type request information transmitted to the partner communication terminal.

It should be noted that another aspect of the present invention may include a program that causes at least one computer to perform the communication method according to the second aspect described above, and a computer-readable storage medium that records such a program. This storage medium includes a non-transitory tangible medium.

Effect of the Invention

According to each of the aspects described above, it is possible to provide a technique for improving the usability of user-to-user communication means using communication terminals.

BRIEF DESCRIPTION OF THE DRAWINGS

The above-described object and other objects of the present invention, and features and advantages of the present invention will be made further clear by the preferred embodiment described below and the following drawings attached thereto.

FIG. 8A is a diagram illustrating a transition of a display screen when terminal operation communication is used.

FIG. 8C is a diagram illustrating a transition of a display screen when a video call is used, in the first example.

FIG. 8D is a diagram illustrating a transition of a display screen when a paint call is used, in the first example.

FIG. 10 is a diagram illustrating a transition of a display screen when a video call is used in a two-way state, in the second example.

DESCRIPTION OF EMBODIMENTS

Hereinafter, an exemplary embodiment of the present invention will be described. Meanwhile, the following exemplary embodiment is illustrative, and the present invention is not limited to a configuration of the following exemplary embodiment.

Figure 1:
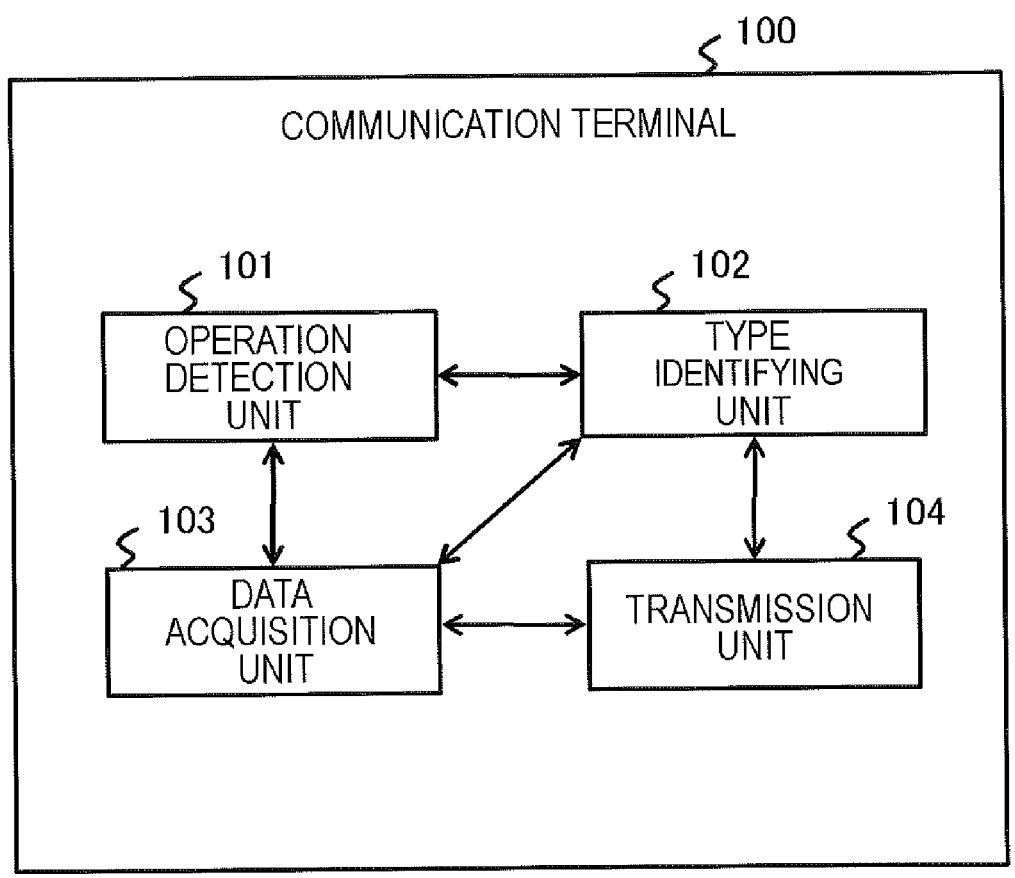
FIG. 1 is a diagram conceptually illustrating a configuration example of a communication terminal according to an exemplary embodiment of the present invention.

FIG. 1 is a diagram conceptually illustrating a configuration example of a communication terminal 100 according to an exemplary embodiment of the present invention. As shown in FIG. 1, the communication terminal 100 includes a an operation detection unit 101 that detects a user's operation to the communication terminal itself, a type identifying unit 102 that identifies a type of user-to-user communication means corresponding to the user's operation which is detected by the operation detection unit 101, from types of user-to-user communication means to which switching is allowed from a type of current user-to-user communication means which is currently used, among multiple types of user-to-user communication means capable of being implemented using communication between a partner communication terminal and the communication terminal itself, a data acquisition unit 103 that acquires communication media data of a user of the communication terminal itself, which corresponds to the type of user-to-user communication means identified by the type identifying unit 102, and a transmission unit 104 that transmits type request information indicating the type of user-to-user communication means identified by the type identifying unit 102 and the communication media data acquired by the data acquisition unit 103, to the partner communication terminal. The type identifying unit 102 determines a range of the types of user-to-user communication means to which switching is allowed from the type of current user-to-user communication means, in accordance with a status of response from the partner communication terminal with respect to the type request information transmitted to the partner communication terminal.

Figure 3:
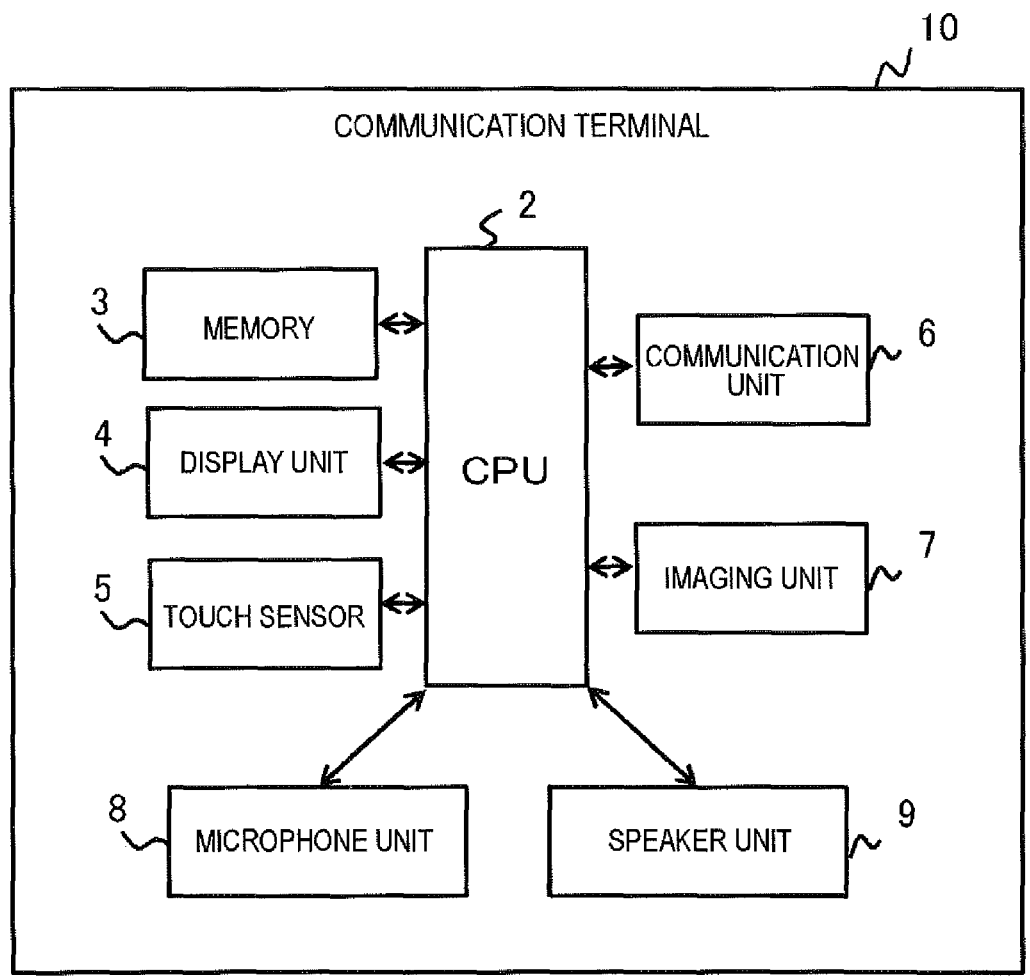
FIG. 3 is a diagram conceptually illustrating a hardware configuration example of a communication terminal in a first example.

The communication terminal 100 has, for example, the same hardware configuration as that of a communication terminal 10 in the detail exemplary embodiment (each example) described later (see FIG. 3), and each of the units mentioned above is realized by programs being processed similarly to the communication terminal 10. The communication terminal 100 may not include a touch sensor 5, an imaging unit 7, a microphone unit 8 and a speaker unit 9 which are illustrated in FIG. 3. In addition, the exemplary embodiment of the present invention may be a program for causing the communication terminal to execute the above-mentioned communication method, and may be a communication terminal readable recording medium having such a program recorded thereon.

Figure 2:
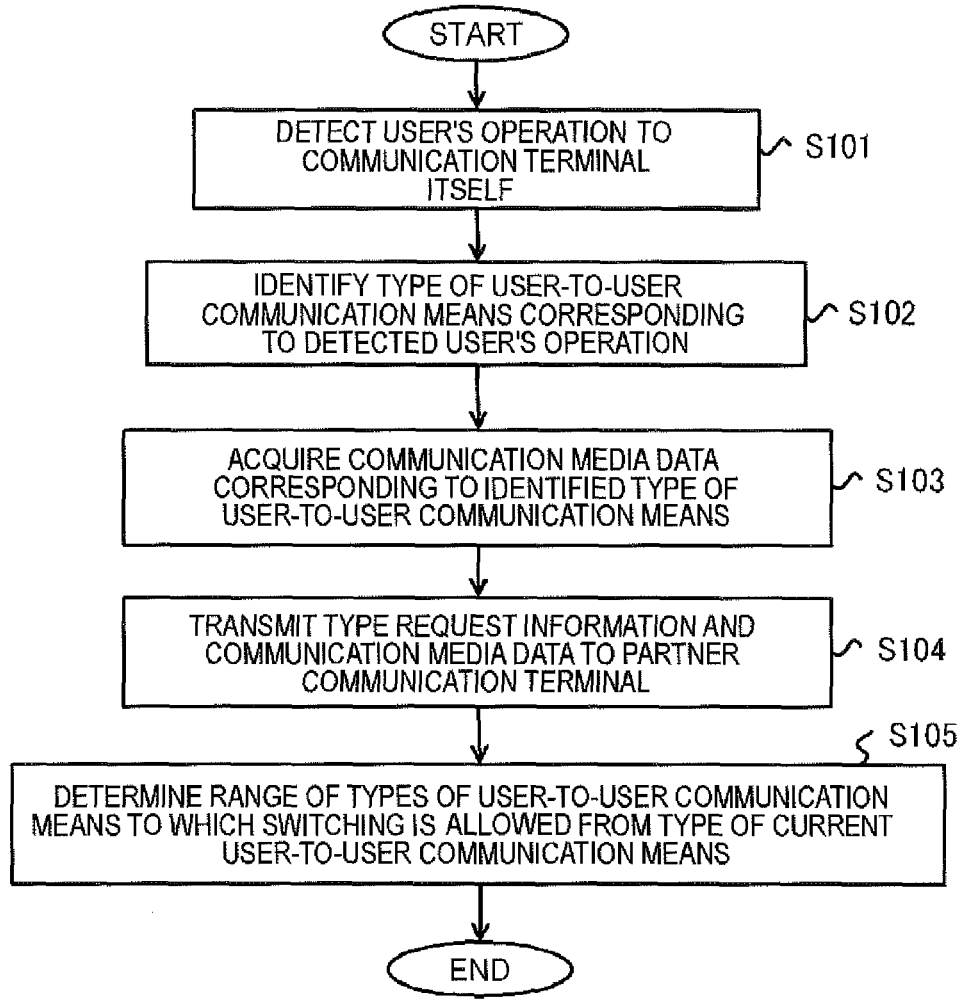
FIG. 2 is a flow diagram illustrating an operation example of the communication terminal according to the present exemplary embodiment.

Next, a communication method according to the exemplary embodiment of the present invention will be described with reference to FIG. 2. FIG. 2 is a flow diagram illustrating an operation example of the communication terminal 100 according to the present exemplary embodiment. Herein, the order of steps which are executed by the communication terminal 100 is not limited to the order shown in FIG. 2, and the order can be changed in a range without interference with contents. In addition, in the following description, the communication terminal 100 serves as an execution subject of the communication method, but each of the units mentioned above included in the communication terminal 100 may serve as an execution subject.

The communication terminal 100 detects a user's operation to the communication terminal 100 itself (S101). In the present exemplary embodiment, insofar as the user's operation is capable of being detected by various types of sensor which are included in the communication terminal 100 or are connected to the communication terminal 100, there is no limitation to the user's operation itself to be detected. For example, the user's operation to be detected may be a contact operation or a noncontact floating touch operation of a touch panel, may be a proximity (breakaway) operation capable of being detected by a proximity sensor, and may be a vibration operation or a gesture operation capable of being detected by a vibration sensor or an imaging sensor.

Subsequently, the communication terminal 100 identifies the type of user-to-user communication means corresponding to the user's operation detected in (S101) (S102). In this case, the communication terminal 100 selectively identifies the type of user-to-user communication means from plural types of user-to-user communication means capable of being implemented using communication between the partner communication terminal and the communication terminal 100 itself. The types of user-to-user communication means may include a voice call, a video call, an image call, a paint call, e-mail, chatting, terminal operation communication, and the like. In the present exemplary embodiment, there is no limitation to the types of user-to-user communication means.

The term "paint call" as used herein means a transmission method of exchanging drawing information drawn by a user's operation, together with a moving image or a still image which is captured by an imaging device (imaging unit). In addition, the term "terminal operation communication" refers to one of user-to-user communication means, and is a transmission method of exchanging the user's operation itself of the communication terminal 100 such as a tap operation or a flip operation. The details of this terminal operation communication will be described later.

In addition, multiple types of user-to-user communication means capable of being implemented using communication between the partner communication terminal and the communication terminal 100 itself are determined in accordance with, for example, hardware and software included in the partner communication terminal and the communication terminal 100 itself, communication infrastructure between the partner communication terminal and the communication terminal 100 itself, communication service contract statuses of users of these terminals, and the like. Thus, the communication terminal 100 may exchange information of the type of user-to-user communication means capable of being implemented by communicating with the partner communication terminal.

Subsequently, the communication terminal 100 acquires communication media data of a user of the communication terminal 100 itself which corresponds to the type of user-to-user communication means identified in (S102) (S103). The term "communication media data" refers to content data which is exchanged in user-to-user communication means used between the partner communication terminal and the communication terminal 100 itself. Thus, the communication media data which is acquired in (S103) is formed by at least one of sound data, moving image data, still image data, text data, control data, and the like corresponding to the type of user-to-user communication means identified in (S102).

The communication terminal 100 transmits type request information indicating the type of user-to-user communication means identified in (S102) and the communication media data acquired in (S103), to the partner communication terminal (S104). The user of the communication terminal 100 sends the type request information and the communication media data, and thus requests a user of the partner communication terminal to use the user-to-user communication means having the type identified in (S102).

Here, the communication terminal 100 operates as follows in order to determine whether user-to-user communication means having a type corresponding to a user's operation detected afterward is used. That is, the communication terminal 100 determines a range of the types of user-to-user communication means to which switching is permitted from the type of user-to-user communication means indicated by the type request information transmitted in (S104), in accordance with the status of response from the partner communication terminal with respect to the type request information transmitted in (S104) (S105). Thereby, during execution next time (S102) is, the communication terminal 100 selectively specifies the type of user-to-user communication means from a range of the types of user-to-user communication means determined in (S105), among multiple types of user-to-user communication means capable of being implemented using communication between the partner communication terminal and the communication terminal 100 itself.

Further, the exemplary embodiment of the present invention may be a program for causing the communication terminal 100 to execute each process as shown in FIG. 2 or a computer readable recording medium having such a program recorded thereon.

As described above, in the present exemplary embodiment, the user of the partner communication terminal is requested to use the user-to-user communication means having the type identified in accordance with the user's operation, and the range of the types of user-to-user communication means to which switching is allowed from the type of requested current user-to-user communication means is determined in accordance with the status of response from the partner communication terminal with respect to the request. In this manner, in the present exemplary embodiment, available means is appropriately determined from among multiple types of user-to-user communication means capable of being implemented using communication between the partner communication terminal and the communication terminal 100 itself in accordance with the status of user-to-user communication which has already been performed.

Incidentally, it is known that the degree of intimacy between users during communication becomes gradually higher with the progress of communication, and that a sense of ease (sense of relaxation) of each user tends to increase as the communication progresses. From this, the inventors have considered that as the degree of intimacy between users during communication becomes higher, there is a tendency for the users to exchange information having high privacy.

On the other hand, there is a difference in degree between the levels of privacy in information which are exchanged by multiple types of user-to-user communication means capable of being implemented between communication terminals. For example, a video call is communication means having high privacy, by reason of moving image data showing an individual current appearance and whereabouts and sound data of an individual voice being exchanged. A voice call is communication means having privacy lower than that of the video call, by reason of only sound data of an individual voice being exchanged. In addition, chatting or e-mail is communication means having privacy lower than that of the voice call, by reason of only text data being exchanged.

Consequently, the inventors gained the idea that multiple types of user-to-user communication means capable of being implemented are classified into the levels of privacy, and the degree of intimacy between users during communication and the level of privacy of multiple types of user-to-user communication means are associated with each other, thereby allowing an easy-to-use communication tool having a small psychological burden to a user to be realized. Specifically, the inventors have found that such multiple types of user-to-user communication means can be switched in a stepwise manner in association with the level of the degree of intimacy between users during communication, thereby allowing the usability of user-to-user communication means using communication terminals to be improved. For example, it is considered that the start of communication from chatting or e-mail having privacy lower than that of the video call indicating an individual current appearance and whereabouts gives a small psychological burden to users who are general acquaintances. Such users can perform communication at ease by the stepwise transition of communication means such as a transition to the voice call starting from exchange of text as in chatting, and a further transition to the video call.

According to the aforementioned exemplary embodiment, the range of user-to-user communication means available at a certain point in time is appropriately determined in accordance with the status of user-to-user communication which has already been performed, and thus multiple types of user-to-user communication means can also be switched in a stepwise manner as described above. Therefore, according to the aforementioned exemplary embodiment, since multiple types of user-to-user communication means on which a psychological effect on a person in user-to-user communication is reflected can be switched in a stepwise manner, it is possible to improve the usability of user-to-user communication means using communication terminals.

Hereinafter, the aforementioned exemplary embodiment will be described in more detail. Hereinafter, each example is illustrated as a specific exemplary embodiment. The description of the following examples will be given with a focus on contents different from those in the aforementioned exemplary embodiment, and the same contents as those in the aforementioned exemplary embodiment will not be repeated.

First Example

[Device Configuration]

FIG. 3 is a diagram conceptually illustrating a hardware configuration example of a communication terminal 10 in a first example. The communication terminal 10 in the first example is a so-called computer such as a PC, a cellular phone, a smartphone, or a tablet terminal. For example, the communication terminal 10 includes a CPU (Central Processing Unit) 2, a memory 3, a display unit 4, a touch sensor 5, a communication unit 6, an imaging unit 7, a microphone unit 8, a speaker unit 9, and the like. The CPU 2 is connected to each of other units by a communication line such as a bus.

The memory 3 is a RAM (Random Access Memory), a ROM (Read Only Memory), or an auxiliary storage device (such as a hard disk). The display unit 4 includes a monitor such as an LCD (Liquid Crystal Display) or a CRT (Cathode Ray Tube) display, and performs display processing.

The touch sensor 5 receives an operation input from a user by sensing contact from the outside. The touch sensor 5 may be a sensor capable of detecting a proximity state from the outside even in a noncontact state. In addition, the display unit 4 and the touch sensor 5 may be realized as a touch panel unit. Further, the communication terminal 10 may be provided with an input and output interface (not shown) which is connected to an input device such as a mouse or a keyboard, together with the touch sensor 5 or instead of the touch sensor 5.

The imaging unit 7 includes an in-camera and an out-camera, and acquires each captured image using each camera. The microphone unit 8 is a sound collection device. The speaker unit 9 is a voice output device. In the example of FIG. 3, the touch sensor 5, the imaging unit 7 and the microphone unit 8 are illustrated as hardware elements capable of detecting a user's operation, but the communication terminal 10 may include a vibration sensor, an acceleration sensor, and a geomagnetic sensor (which are not shown in the drawing) which are capable of detecting other types of a user's operation.

The communication unit 6 performs wireless communication or cable communication, and communicates with another communication terminal through a communication network. The communication unit 6 transmits and receives communication media data through this communication. The communication network is a cellular phone line network, a Wi-Fi (Wireless Fidelity) line network, an Internet communication network, a leased line network, a LAN (Local Area Network), or the like. In the present example, a communication mode between the communication terminals 10 is not limited.

In the first example, insofar as a computer has a communication function, a function of detecting a user's operation, and a function of acquiring communication media data, there is no limitation to the hardware configuration of the communication terminal 10. In addition, in the first example, multiple types of user-to-user communication means capable of being implemented in the communication terminal 10 are not limited.

For the convenience of description, in the first example, as the types of user-to-user communication means capable of being implemented in the communication terminal 10, terminal operation communication, a voice call, a video call, and a paint call are illustrated as in the example of FIG. 2. In the first example, the level of privacy of each user-to-user communication means is set to increase in order of the terminal operation communication, the voice call, the video call, and the paint call.

Further, in the first example, the execution state of each user-to-user communication means is provided with two states of a one-way state and a two-way state. The one-way state means a state in which, while one user requests a partner user to use user-to-user communication means of a certain type, communication media data corresponding to the type is sent to a partner communication terminal unilaterally. The two-way state means a state in which both users agree to use user-to-user communication means of a type, and communication media data corresponding to the type is sent therebetween.

Figure 4:
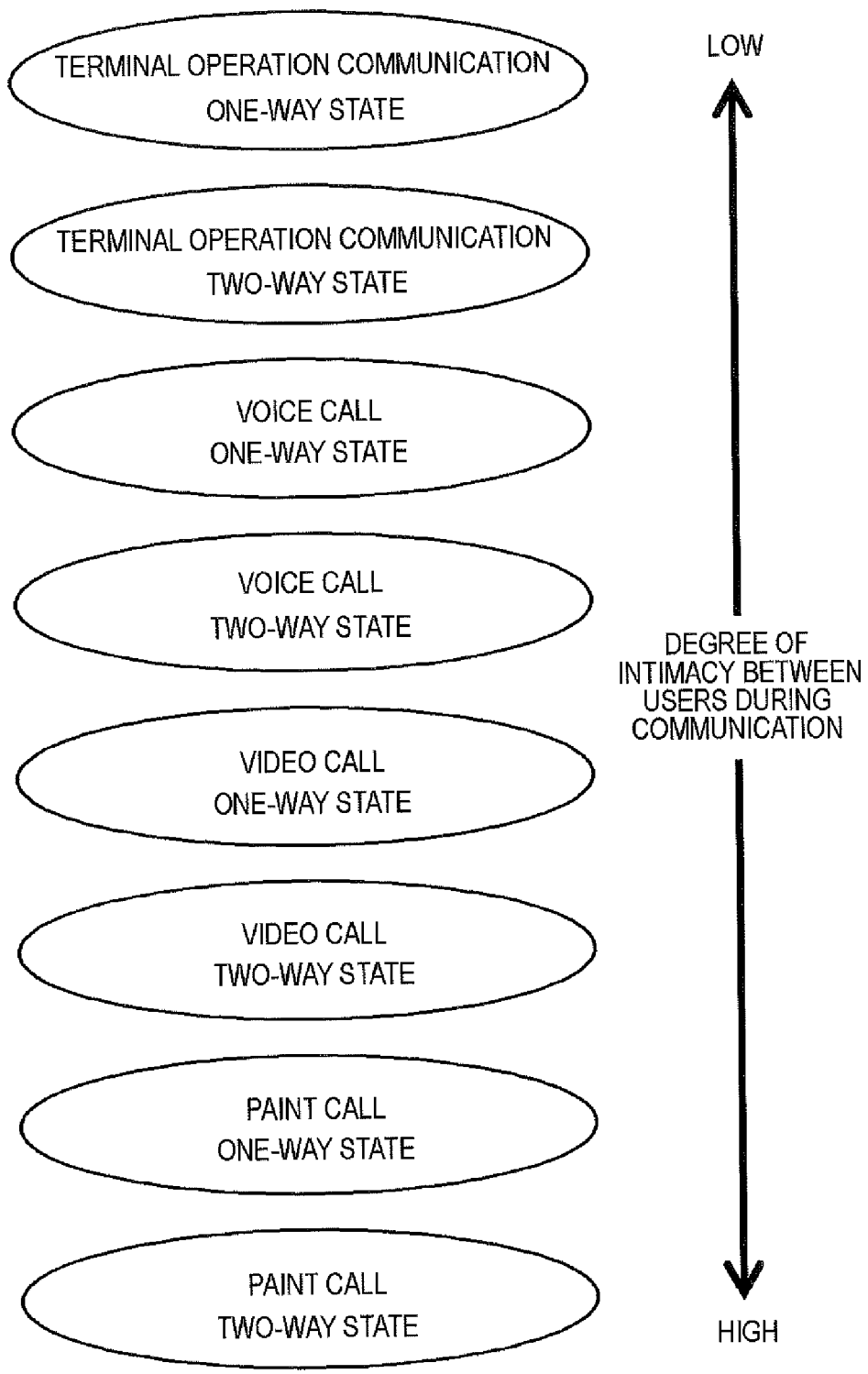
FIG. 4 is a diagram conceptually illustrating a state transition of user-to-user communication in the first example.

FIG. 4 is a diagram conceptually illustrating a state transition of user-to-user communication in the first example. As shown in FIG. 4, in the first example, the execution state of user-to-user communication is managed using eight execution states, and each of the execution states is associated with the degree of intimacy between users during communication as shown in FIG. 4. In this manner, the execution state of communication is managed in association with the degree of intimacy between users during communication, and thus an improvement in the usability of user-to-user communication means is achieved.

The communication terminal 10 in the first example determines a range of means available from among four types of user-to-user communication means, at a certain point in time, on the basis of the arrangement of execution states shown in FIG. 4, that is, the level of user-to-user communication. In the following description, as shown in FIG. 4, the level of user-to-user communication means is assumed to be represented in accordance with the level of the degree of intimacy between users. For example, user-to-user communication means which is one level higher than that of a voice call is a video call, and user-to-user communication means which is one level lower than the voice call is terminal operation communication.

[Processing Configuration]

Figure 5:
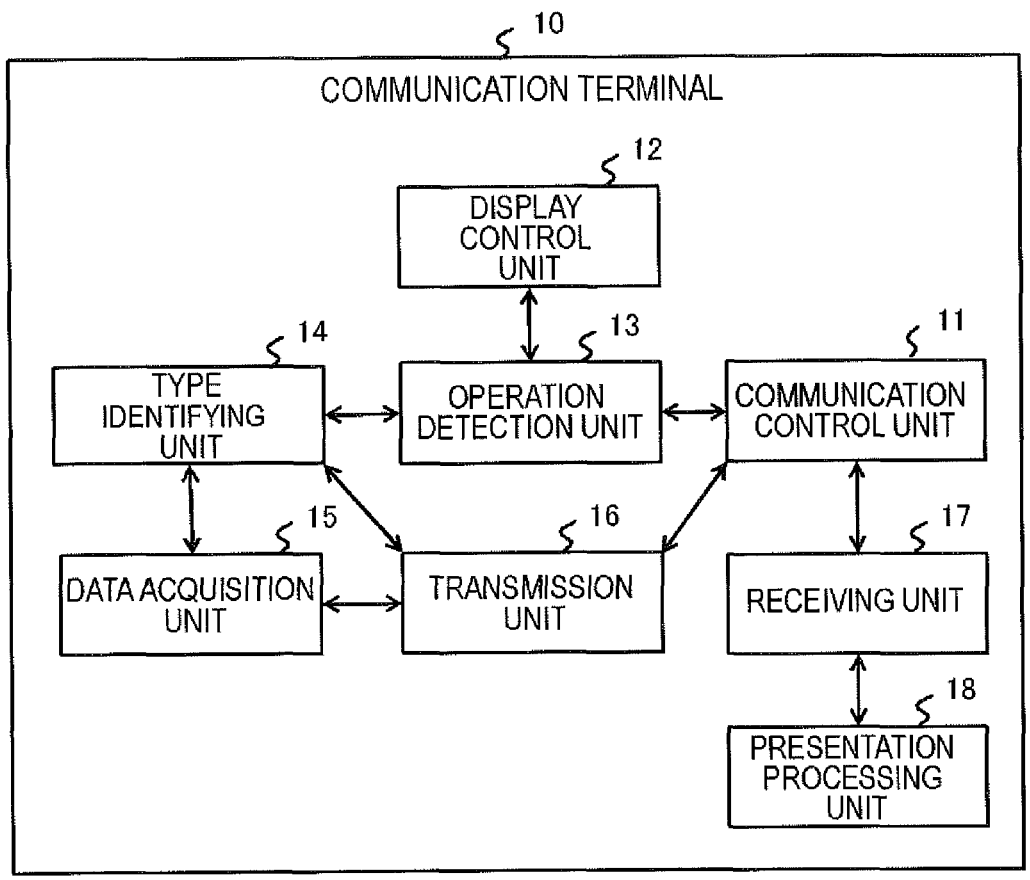
FIG. 5 is a diagram conceptually illustrating a process configuration example of the communication terminal in the first example.

FIG. 5 is a diagram conceptually illustrating a process configuration example of the communication terminal 10 in the first example. The communication terminal 10 in the first example includes a communication control unit 11, a display control unit 12, an operation detection unit 13, a type identifying unit 14, a data acquisition unit 15, a transmission unit 16, a receiving unit 17, a presentation processing unit 18, and the like. Each of these processing units is realized, for example, by a program stored in the memory 3 by the CPU 2 being executed. In addition, the program may be installed from a portable recording medium such as, for example, a CD (Compact Disc) or a memory card, or another computer on a network, and may be stored in the memory 3.

The communication control unit 11 causes the operation detection unit 13 to detect a user's operation of a start screen (the details of which will be described later) which is displayed during communication start by a process of the display control unit 12, and establishes communication between a partner communication terminal selected by the user's operation and the communication terminal 10 itself. The term "communication establishment" as used herein means a mutual communication enabling state between the communication terminal 10 itself and the partner communication terminal. For example, when SIP (Session Initiation Protocol) is used, session establishment is equivalent to the communication establishment. In addition, in the principle of Skype (Registered Trademark), making it possible to perform mutual communication through another node called a super node or the like is equivalent to the communication establishment. In addition, when a line switching network is used, a call connection state is equivalent to the communication establishment. However, in the first example, a communication mode and a communication establishment method are not limited. Thus, specific information of the partner communication terminal for establishing communication is not also limited. The specific information of the partner communication terminal is, for example, a telephone number, an IP (Internet Protocol) address, an e-mail address, a user ID, or the like, and is held by the communication terminal 10 in advance.

The operation detection unit 13 corresponds to the operation detection unit 101 in the aforementioned exemplary embodiment. The operation detection unit 13 in the first example detects a user's operation to a display screen which is displayed on the monitor of the display unit 4, on the basis of contact information or proximity information which is sent from the touch sensor 5. For example, the operation detection unit 13 detects a user's operation during the terminal operation communication. In addition, the operation detection unit 13 detects a paint operation to the monitor as a user's operation. The paint operation means an operation which is performed on the monitor of the display unit 4 using a paint tool which is started up in the communication terminal 10 as if the user draws pictures or characters.

The type identifying unit 14 is equivalent to the type identifying unit 102 in the aforementioned exemplary embodiment. The type identifying unit 14 in the first example identifies the type of any one user-to-user communication means of the terminal operation communication, the voice call, the video call and the paint call, on the basis of the user's operation which is detected by the operation detection unit 13. In this case, in order to make it possible to switch four types of user-to-user communication means in a stepwise manner, as described in the aforementioned exemplary embodiment, the type identifying unit 14 determines a range of the types of user-to-user communication means to which switching is permitted from the type of current user-to-user communication means, in accordance with the status of response from the partner communication terminal with respect to the type request information transmitted to the partner communication terminal. Hereinafter, the range of the types of user-to-user communication means to which switching is permitted from the type of current user-to-user communication means may be denoted by a switching permission range.

For example, the type identifying unit 14 can determine the switching permission range so that switching to user-to-user communication means jumping up multiple levels is performed only when lowest-order user-to-user communication means is permitted in a two-way state in the arrangement (level) of the user-to-user communication means as shown in FIG. 4. This is because, when the lowest-order user-to-user communication means is executed in a two-way state, it is considered that a minimum approval is made on the execution of communication between users. When a minimum approval is made, it is considered that there is a low possibility of a psychological burden remarkably increasing between the users even in a case where levels of the degree of intimacy are skipped to a certain extent. However, user-to-user communication means used in regarding a minimum approval having been made is preferably the lowest-order user-to-user communication means, but may be user-to-user communication means other than the lowermost level which is specified in advance.

In the first example, the type identifying unit 14 can determine the switching permission range so that switching to user-to-user communication means jumping up multiple levels is permitted only when the terminal operation communication is performed in a two-way state. In this case, when the terminal operation communication is performed in a two-way state, the type identifying unit 14 determines the switching permission range to be a voice call, a video call, and a paint call. On the other hand, when a response is not received from the partner communication terminal with respect to the use of the terminal operation communication, the type identifying unit 14 limits the switching permission range to only a voice call.

According to such a configuration, it is possible to adapt to various communication scenes. For example, when the terminal operation communication is performed in a two-way state, and then a partner does not respond to a request for voice communication from the user of the communication terminal 10, the user of the communication terminal 10 can make an attempt at a video call, with the hope of a possible response to other means (for example, video call). In addition, after the terminal operation communication is performed in a two-way state, the user of the communication terminal 10 can also make a request for a sudden paint call due to it being troublesome to follow the levels.

In addition, the type identifying unit 14 can perform control so that the user-to-user communication means is switched in a stepwise manner only in order of the arrangement (level) of the user-to-user communication means as shown in FIG. 4. In this case, the switching of the user-to-user communication means is subject to tightening limitation, but a user can perform communication at ease even when communicating with any partner. In this case, when a response is not received from the partner communication terminal with respect to the type request information transmitted from the communication terminal 10 itself, the type identifying unit 14 determines only the types of user-to-user communication means lower than the type of user-to-user communication means (type of current user-to-user communication means) indicated by the type request information to be a range of the types of user-to-user communication means to which switching is allowed. On the other hand, when a response is received from the partner communication terminal, the type identifying unit 14 determines only the types of user-to-user communication means lower and one level higher than the type of current user-to-user communication means to be a range of the types of user-to-user communication means to which switching is allowed.

When a user's operation corresponding to the type of user-to-user communication means other than the switching permission range determined as described above is detected by the operation detection unit 13, the type identifying unit 14 may ignore the user's operation, and may request the display control unit 12 to display an error indication that the user-to-user communication means corresponding to the user's operation is not received.

The data acquisition unit 15 is equivalent to the data acquisition unit 103 in the aforementioned exemplary embodiment. When the type of user-to-user communication means is identified by the type identifying unit 14, the data acquisition unit 15 in the first example brings the imaging unit 7 or the microphone unit 8 into operation in accordance with the identified type, and acquires communication media data of a user of the communication terminal 10 itself which corresponds to the identified type.

When the type identifying unit 14 identifies the terminal operation communication, the data acquisition unit 15 generates terminal operation information indicating contents of the user's operation in terminal operation communication, as communication media data, on the basis of the user's operation detected by the operation detection unit 13. Here, the contents of the user's operation in terminal operation communication are represented by an operation position, the number of times of operation, the speed of operation, the magnitude of operation, the strength of operation, an operation type (such as a screen touch, a button operation, or a shake operation), and the like. For example, in the terminal operation communication, when a user performs an operation for hitting (knocking) a certain position of the monitor two times, the terminal operation information indicates a hit position, the number of hits (two times), and an operation type (hit). In addition, when a user performs an operation for shaking the communication terminal 10 three times, the terminal operation information indicates the number of shakes (three times) and an operation type (shake). In addition, when a user performs an operation for stroking the monitor from a certain position to a certain position one time, the terminal operation information indicates positions of a start point and an end point, the number of strokes (one time), and an operation type (flick or drag). However, in the first example, there is no limitation to the contents of the user's operation which is performed in the terminal operation communication.

When the type identifying unit 14 identifies a voice call, the data acquisition unit 15 acquires voice data of a user of the communication terminal 10 itself, as communication media data, by bringing the microphone unit 8 into operation. When the type identifying unit 14 identifies a video call, the data acquisition unit 15 acquires voice data and moving image data of a user of the communication terminal 10 itself, as communication media data, by bringing the microphone unit 8 and the imaging unit 7 into operation. Hereinafter, the denotation of the voice data and the moving image data does not mean the number of data units (files or the like) to be realized. The voice data and the moving image data may be realized by one data unit, and may be realized by two data units.

When the type identifying unit 14 identifies a paint call, the data acquisition unit 15 acquires the voice data and the moving image data of the user of the communication terminal 10 itself similarly to the video call, and further acquires trace information of the paint operation, detected as the user's operation by the operation detection unit 13, as communication media data.

On the other hand, when the communication terminal 10 itself is a side that receives communication, the data acquisition unit 15 stops a process of acquiring the communication media data corresponding to the requested type until a specific user's operation indicating an agreement to the request is detected by the operation detection unit 13. The communication terminal 10 in the first example realizes a one-way state of user-to-user communication means through such control of the data acquisition unit 15. Specifically, when a voice call is requested from the partner communication terminal, the data acquisition unit 15 of the communication terminal 10 itself stops a process of acquiring the voice data from the microphone unit 8 until an agreement to the request is made by the user of the communication terminal 10 itself. In addition, when a video call is requested from the partner communication terminal, the data acquisition unit 15 of the communication terminal 10 itself stops a process of acquiring the moving image data from the imaging unit 7 until an agreement to the request is made by the user of the communication terminal 10 itself. In such a case, the data acquisition unit 15 may not bring the imaging unit 7 and the microphone unit 8 into operation.

The transmission unit 16 is equivalent to the transmission unit 104 in the aforementioned exemplary embodiment. The transmission unit 16 transmits the type request information and the communication media data to the partner communication terminal using a communication resource established by the process of the communication control unit 11. When the type request information indicates the terminal operation communication, the terminal operation information is transmitted as the communication media data. In addition, when the type request information indicates a voice call, the voice data is transmitted. When the type request information indicates a video call, the voice data and the moving image data are transmitted. When the type request information indicates a paint call, the voice data, the moving image data and the trace information of the paint operation are transmitted.

The receiving unit 17 receives the type request information and the above communication media data which are transmitted using the communication resource established from the partner communication terminal by the process of the communication control unit 11. The process of the receiving unit 17 is executed when the user of the communication terminal 10 itself is requested to use the user-to-user communication means of a type indicated by the type request information from the user of the partner communication terminal.

The presentation processing unit 18 outputs the communication media data, using an output method corresponding to the type request information, on the basis of the type request information and the communication media data which are received by the receiving unit 17. The output method is, for example, at least one of a display output, a voice output and a vibration output. In the first example, an output method of any one of the display output and the voice output or a combination thereof is used. Specifically, when the type request information indicates a voice call, the presentation processing unit 18 outputs a voice on the basis of the received voice data. In addition, when the type request information indicates a video call, the presentation processing unit 18 performs a voice output and a moving image display output on the basis of the voice data and the moving image data which are received. When the type request information indicates a paint call, the presentation processing unit 18 displays and outputs a moving image and a paint trace indicated by the trace information of the paint operation, together with the voice output.

When the type request information received by the receiving unit 17 indicates the terminal operation communication, the presentation processing unit 18 outputs presentation contents corresponding to the contents of the user's operation indicated by the terminal operation information, using an output method corresponding to an operation type indicated by the terminal operation information. For example, when the terminal operation information received by the receiving unit 17 indicates a hit position, the number of hits (two times), and an operation type (hit), the presentation processing unit 18 causes the display unit 4 to display ripple shapes of the number of hits, corresponding to the operation type (hit), at a display position corresponding to the hit position. In this case, the presentation processing unit 18 may cause the speaker unit 9 to perform a voice output on knocking sounds of the number of hits, together with the display output. In the terminal operation communication, it is preferable that, in the communication terminal 10 on a side where an operation is performed and the communication terminal 10 on a side where the operation contents is transmitted, the same output indicating the operation contents is performed.

Further, the presentation processing unit 18 may output the communication media data as described above, and may output an image or text information for presenting type of user-to-user communication means indicated by the type request information to a user.

The display control unit 12 causes the display unit 4 to display a predetermined display screen in accordance with the level of the user-to-user communication means. The details of the predetermined display screen will be described later. In addition, when the presentation processing unit 18 gives an instruction for the display output, the display control unit 12 updates the display screen for displaying the communication media data to be displayed.

For example, at the start of communication, the display control unit 12 displays a screen (hereinafter, denoted by a start screen) in which plural view elements indicating plural communication partner candidates are drawn in positions and forms each corresponding to a relationship between the user of the communication terminal 10 itself and each communication partner candidate. The communication partner candidates may indicate the partner communication terminals themselves, and may indicate the users of the partner communication terminals. Each view element indicating each communication partner candidate may be an image, and may be text information. The drawing position and the drawing form of each view element may be determined by relevant information (such as relatives, friends, lovers, fellow workers of a company) of the communication partner candidates which are set in a telephone book or the like in advance, and may be determined by the frequency of user-to-user communication. For example, as a relationship with the communication partner candidate becomes closer, the view element may be displayed larger in the center of a screen, and a view element of an estranged communication partner candidate may be fixed and displayed smaller at the corner of the screen.

Figure 6:
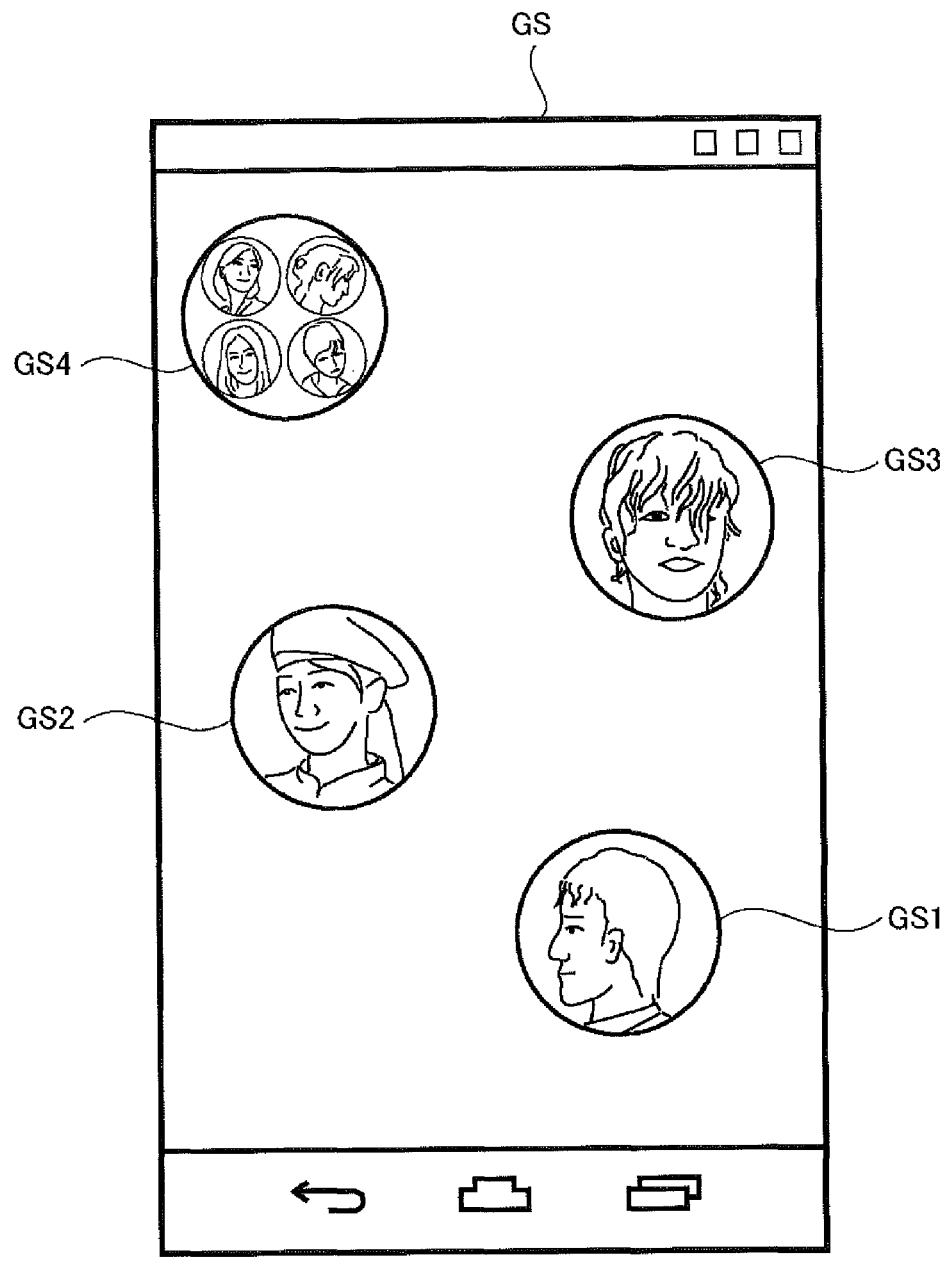
FIG. 6 is a diagram illustrating an example of a start screen.

FIG. 6 is a diagram illustrating an example of a start screen. In a start screen GS shown in the example of FIG. 6, four view elements GS1, GS2, GS3 and GS4 indicating four communication partner candidates are sporadically displayed. Each view element is formed by each face image of the communication partner candidate. In addition, the view element GS4 indicates plural communication partner candidates. When the view element GS4 is selected by a user, the communication terminal 10 may separate the communication partner candidates indicated by the view element GS4 into an individual view element and display the individual view element.

[Operation Example]

<<Communication Method>>

First, a communication method in the first example will be described with reference to FIGS. 7A and 7B. In the following description, the communication terminal 10 serves as an execution subject of the communication method, but each of the units mentioned above included in the communication terminal 10 may serve as an execution subject.

Figure 7A:
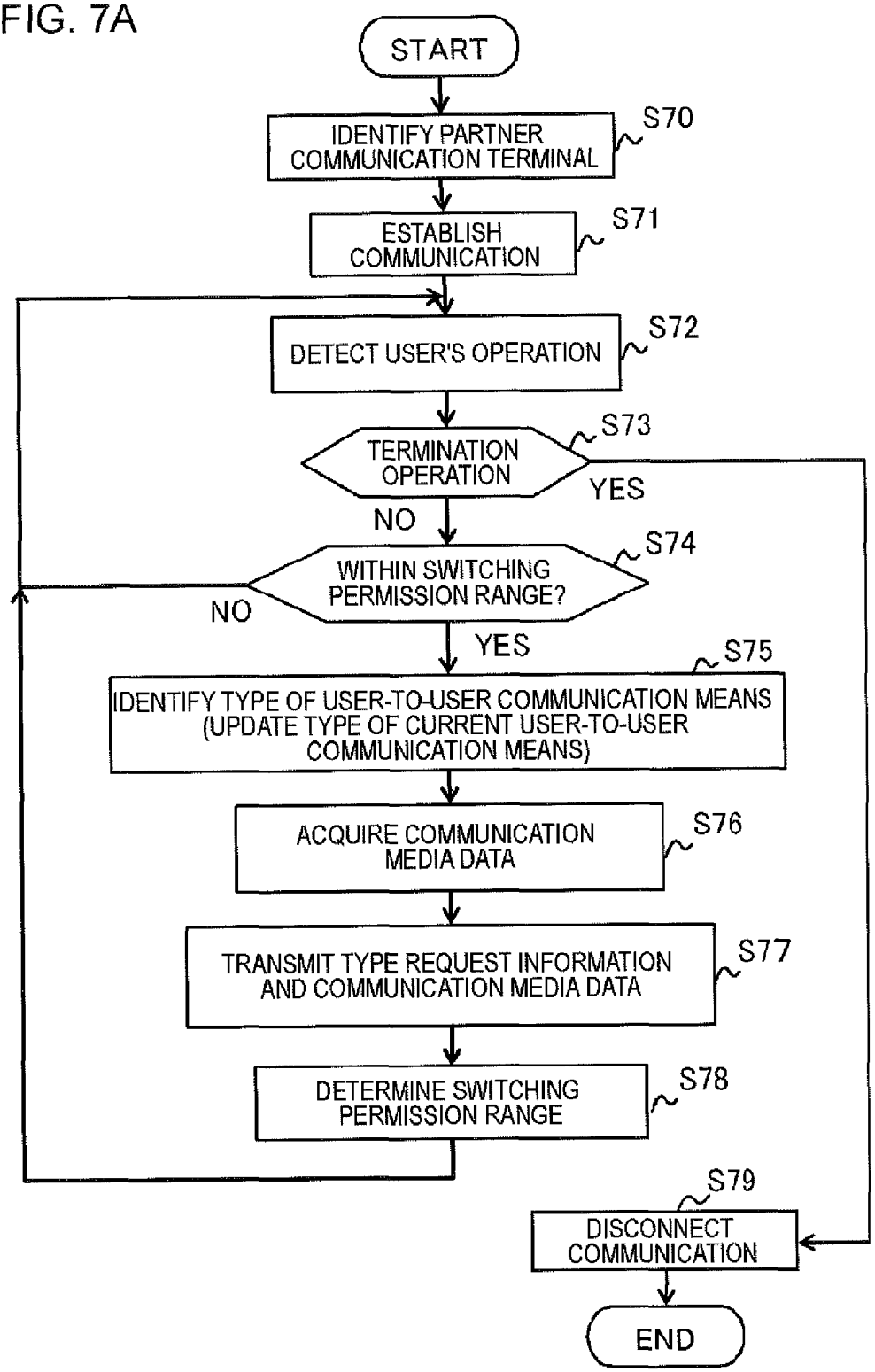
FIG. 7A is a flow diagram illustrating an operation example of the communication terminal in the first example on a side that makes a request for user-to-user communication.

FIG. 7A is a flow diagram illustrating an operation example of the communication terminal 10 of the first example on a side that makes a request for user-to-user communication. When the communication terminal is a side that makes a request for user-to-user communication, the communication terminal 10 operates as follows.

The communication terminal 10 detects a user's operation to a start screen as shown in the example of FIG. 6, and thus specifies a communication terminal (partner communication terminal) which is used by a partner user selected in the user's operation (S70). The communication terminal 10 then establishes communication between a partner communication terminal and the communication terminal 10 itself, on the basis of specific information of the partner communication terminal acquired by the identifying (S71).

Subsequently, the communication terminal 10 detects a user's operation to a display screen which is displayed on the monitor of the communication terminal 10 itself (S72). The communication terminal 10 can detect the user's operation using contact information or proximity information which is sent from the touch sensor 5. The user's operation detected herein is an operation (termination operation) for terminating user-to-user communication, an operation corresponding to the type of user-to-user communication means desired to be used by the user, or the like. However, the details of the user's operation itself to the display screen will be described later.

When the termination operation is detected (S73; YES), the communication terminal 10 disconnects communication established in (S71) (S79). Thereby, the user-to-user communication which is executed is also terminated.

When the user's operation regarding the type of user-to-user communication means is detected (S72, S73; NO), the communication terminal 10 determines whether the type of user-to-user communication means corresponding to the user's operation is within the switching permission range (S74). In this case, when the user-to-user communication is not yet started, the communication terminal 10 sets only the terminal operation communication to be in the switching permission range. When it is determined that the type of user-to-user communication means corresponding to the user's operation is not within the switching permission range (S74; NO), the communication terminal 10 waits for the detection of the next user's operation.

On the other hand, when it is determined that the type of user-to-user communication means corresponding to the user's operation is within the switching permission range (S74; YES), the communication terminal 10 specifies the type of user-to-user communication means (S75). When the user-to-user communication is not yet started, the communication terminal 10 specifies the terminal operation communication. The communication terminal 10 then sets the identified type of user-to-user communication means to the type of current user-to-user communication means.

The communication terminal 10 acquires communication media data corresponding to the identified type of user-to-user communication means (S76). When the terminal operation communication is identified, the communication terminal 10 generates the terminal operation information. When a voice call is identified, the communication terminal 10 acquires voice data from the microphone unit 8. When a video call is identified, the communication terminal 10 acquires moving image data from the imaging unit 7, together with the voice data. When a paint call is identified, the communication terminal 10 acquires trace information of the paint operation from the touch sensor 5, together with the voice data and the moving image data.

Subsequently, the communication terminal 10 transmits type request information indicating the type of user-to-user communication means identified in (S75) and the communication media data acquired in (S76), to the partner communication terminal (S77).

Further, the communication terminal 10 determines the switching permission range in accordance with the type of current user-to-user communication means updated in (S75) and the status of response from the partner communication terminal with respect to the transmission in (S77) (S78). After determining the switching permission range, the communication terminal 10 waits for the detection of the next user's operation. For example, after the terminal operation communication is performed in a two-way state, the communication terminal 10 determines the types of user-to-user communication means higher and lower than that of the current user-to-user communication means to be in the switching permission range. On the other hand, when a response is not received from the partner communication terminal with respect to the use of the terminal operation communication, the communication terminal 10 determines the switching permission range to be a voice call and a type of user-to-user communication means lower than that of the voice call.

Figure 7B:
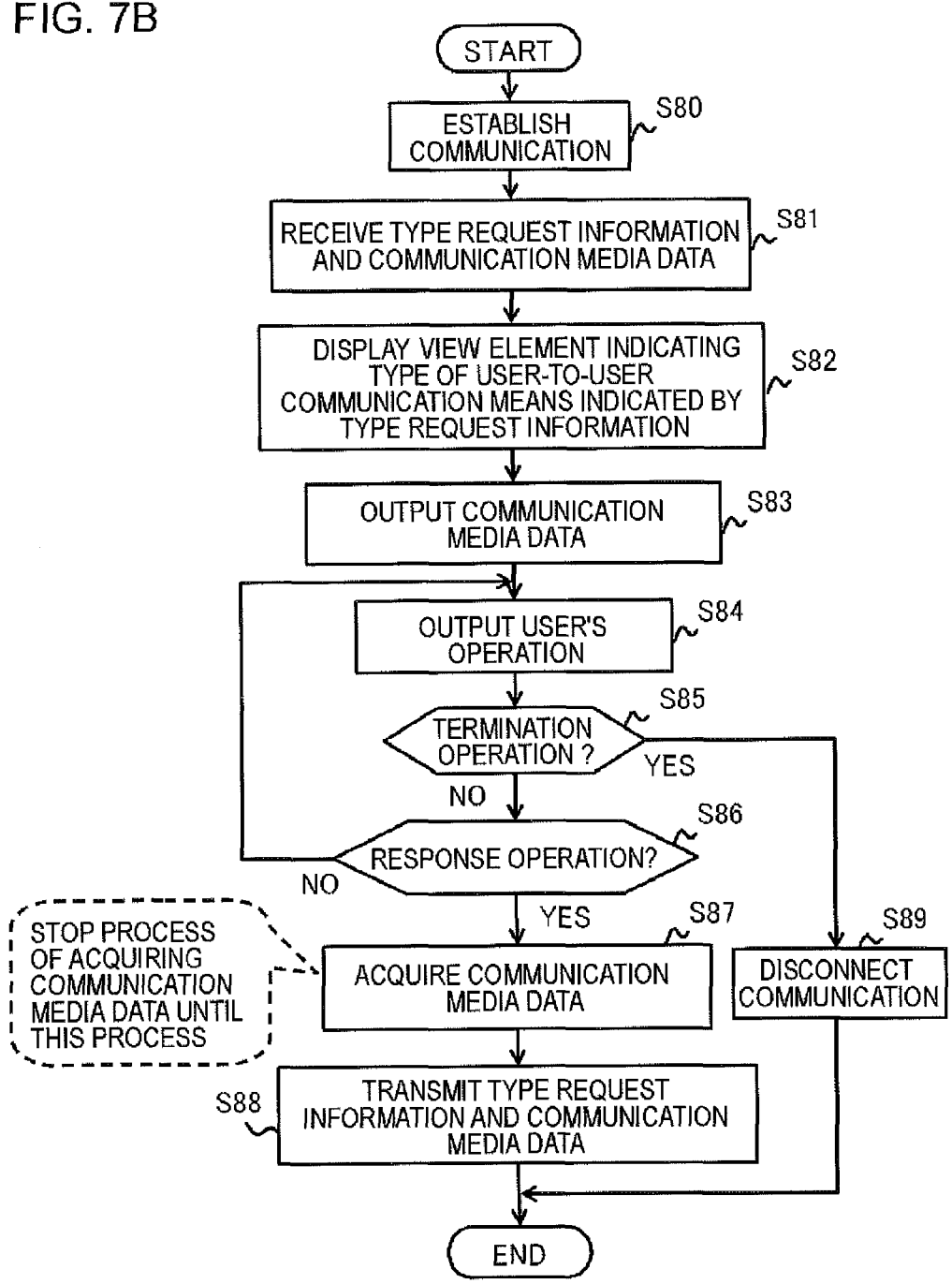
FIG. 7B is a flow diagram illustrating an operation example of the communication terminal in the first example on a side that receives a request for user-to-user communication.

FIG. 7B is a flow diagram illustrating an operation example of the communication terminal 10 in the first example on a side that receives a request for user-to-user communication. When the communication terminal is a side that receives a request for user-to-user communication, the communication terminal 10 operates as follows.

Similarly to (S71) of FIG. 7A, the communication terminal 10 establishes communication with the partner communication terminal (S80). When the communication terminal serves as the side that receives a request for user-to-user communication, a transmission source of a request for the communication establishment is the partner communication terminal. The communication terminal 10 receives the type request information and the communication media data from the partner communication terminal (S81). Thereby, the communication terminal 10 is set to be in a state of receiving a request for the use of user-to-user communication means of a type represented by the received type request information, from the partner communication terminal.

The communication terminal 10 displays a view element, indicating the type of user-to-user communication means indicated by the received type request information, on the monitor of the display unit 4 (S82). Further, the communication terminal 10 outputs the received communication media data using an output method corresponding to the received type request information (S83).

In this case, the communication terminal 10 does not perform (stops) a process of acquiring the communication media data of the user of the communication terminal 10 corresponding to the type of user-to-user communication means indicated by the received type request information. Thereby, the communication terminal 10 and the partner communication terminal are set to be in a state where user-to-user communication means of a type indicated by the received type request information is executed in a one-way state from the partner communication terminal.

In this state, the communication terminal 10 detects a user's operation to the display screen which is displayed on the monitor of the communication terminal 10 itself (S84). The user's operation detected herein is an operation (termination operation) for terminating the user-to-user communication, an operation for agreeing to (responding to) use the user-to-user communication means requested from the partner communication terminal, or the like. The details of the user's operation itself of the display screen will be described later.

When the termination operation is detected (S85; YES), the communication terminal 10 disconnects communication established in (S80) (S89). Thereby, the user-to-user communication which is executed is also terminated. When the detected user's operation is not an operation responding to use the user-to-user communication means requested from the partner communication terminal (S86; NO), the communication terminal 10 waits for the detection of the next user's operation.

When the operation responding to use the user-to-user communication means requested from the partner communication terminal is detected (S84, S85; NO, S86; YES), the communication terminal 10 starts the acquisition of the communication media data of the user of the communication terminal 10, corresponding to the type of user-to-user communication means (S87). In this case, for example, the communication terminal 10 may start up the microphone unit 8, the imaging unit 7 and the like on the basis of the type of user-to-user communication means.

The communication terminal 10 transmits the type request information indicating the type of user-to-user communication means requested from the partner communication terminal and the communication media data acquired in (S87), to the partner communication terminal (S88). Thereby, the communication terminal 10 and the partner communication terminal transitions from a state where the user-to-user communication means of a type indicated by the received type request information is executed in a one-way state from the partner communication terminal, to a state where the user-to-user communication means is executed in a two-way state.

<<Screen Control Method>>

Next, a screen control method in the first example will be described with reference to FIGS. 8A, 8B, 8C and 8D. FIGS. 8A, 8B, 8C and 8D are diagrams illustrating a transition of the display screen which is controlled in the communication terminal 10 of the first example. Hereinafter, an execution subject of the screen control method will be described as the communication terminal 10, but the execution subject may be each unit of the communication terminal 10. Hereinafter, the transition of the display screen will be described in appropriate association with each step of the operation of the communication terminal 10 shown in FIGS. 7A and 7B.

In the following description, the expression that the communication terminal 10 displays a certain display screen on the monitor of the display unit 4 is simplifies as the expression that the communication terminal 10 displays a certain display screen. In addition, the user of the communication terminal 10 is denoted by a user A, and the user of the partner communication terminal is denoted by a user B. In addition, it is assumed that the partner communication terminal also has the same configuration as that of the communication terminal 10 in the first example.

FIG. 8A is a diagram illustrating a transition of the display screen when the terminal operation communication is used. First, the communication terminal 10 displays the start screen GS as shown in the example of FIG. 6 in order to cause the user of the communication terminal 10 to select a partner of user-to-user communication. In the start screen GS, as described above, the view elements indicating communication partner candidates are drawn in positions and forms each corresponding to a relationship between the user A and each communication partner candidate.

The communication terminal 10 detects an operation (tap operation) of the user A, which selects a view element indicating the user B in the start screen GS. Thereby, the communication terminal 10 can identify a partner communication terminal (S70), and can further establish communication with the partner communication terminal (S71). In association with the establishment of communication, the communication terminal 10 displays a display screen G1-A including an image indicating the user B selected as a communication partner. The partner communication terminal displays a display screen G1-B including an image indicating the user A. Each of the images indicating the users A and B may be held in the communication terminal 10 and the partner communication terminal in advance, or may be mutually exchanged through communication. However, in such a state, the users A and B are not yet able to perform user-to-user communication.

The communication terminal 10 detects an operation of the user A corresponding to the terminal operation communication (S72). In the example of FIG. 8A, the communication terminal 10 detects the user A's operation for tapping the display screen G1-A two times as the user's operation corresponding to the terminal operation communication. Further, as shown in the example of FIG. 8A, the communication terminal 10 displays a ripple shape centering on a position at which the user's operation has been performed, in order to visually represent the user's operation. In this case, since the terminal operation communication is within the switching permission range (S74; YES), the communication terminal 10 identifies the terminal operation communication in accordance with the user's operation (S75). Meanwhile, the user's operation corresponding to the terminal operation communication is not limited to the operation of two-times tapping. When a user's operation corresponding to a type other than the terminal operation communication is detected, the communication terminal 10 may ignore the user's operation because the type of user-to-user communication means is not within the switching permission range (S74; NO). Subsequently, the communication terminal 10 generates terminal operation information indicating the operation of two-times tapping (S76), and the type request information indicating the terminal operation communication. The terminal operation information is transmitted to the partner communication terminal (S77).

The partner communication terminal receives the type request information and the terminal operation information (S81), and displays a ripple shape corresponding to the user's operation, indicated by the terminal operation information, at a position corresponding to the user's operation position in the communication terminal 10 (display screen G1-B) (S82). In the example of FIG. 8A, the contents of the user's operation is presented by the view of the ripple shape, but the communication terminal 10 may output a sound (two-times knocking sound) corresponding to the contents of the user's operation, and may output a vibration. In this manner, the user A's operation for tapping the communication terminal 10 two times is transmitted, and is output to the partner communication terminal like an operation for knocking a door.

When approving the terminal operation communication with the user A, the user B may perform the same user's operation as that of the user A to the partner communication terminal. When the user's operation is detected (S84), the partner communication terminal displays a ripple shape similarly to the above-mentioned communication terminal 10 (G2-B), and transmits the type request information indicating the terminal operation communication and the terminal operation information to the communication terminal 10 (S88). Thereby, as shown in a display screen G2-A, the communication terminal 10 displays a ripple shape corresponding to the user B's operation at a position corresponding to the user's operation position in the partner communication terminal.

In the example of FIG. 8A, the user A's operation of two-times tapping is transmitted only once from the communication terminal 10 to the partner communication terminal, but when the user's operation corresponding to the terminal operation communication is performed by the user A multiple times, the terminal operation information is transmitted every time the user's operation is detected. Specifically, when the two-times tapping operation is transmitted, and then a five-times tapping operation is performed at a different position by the user A, the five-times tapping operation is further transmitted and output. In the aforementioned description, the timing of communication establishment is equivalent to a timing when the user B is selected as a partner in the start screen GS, but may be equivalent to a timing when the user's operation corresponding to the terminal operation communication is initially detected in the display screen G1-A. In the first example, the timing of communication establishment is not limited.

The terminal operation communication described above does not use personal information at all, and thus is most suitable for first stage means to start user-to-user communication. Further, according to the terminal operation communication, since the position, the number of times, the speed and the like of the terminal operation can be transmitted, it is difficult to share detailed information, but minimum information can be shared. For example, emergency or the degree of desiring communication can be transmitted on the basis of the number of times or the speed thereof.

Figure 8B:
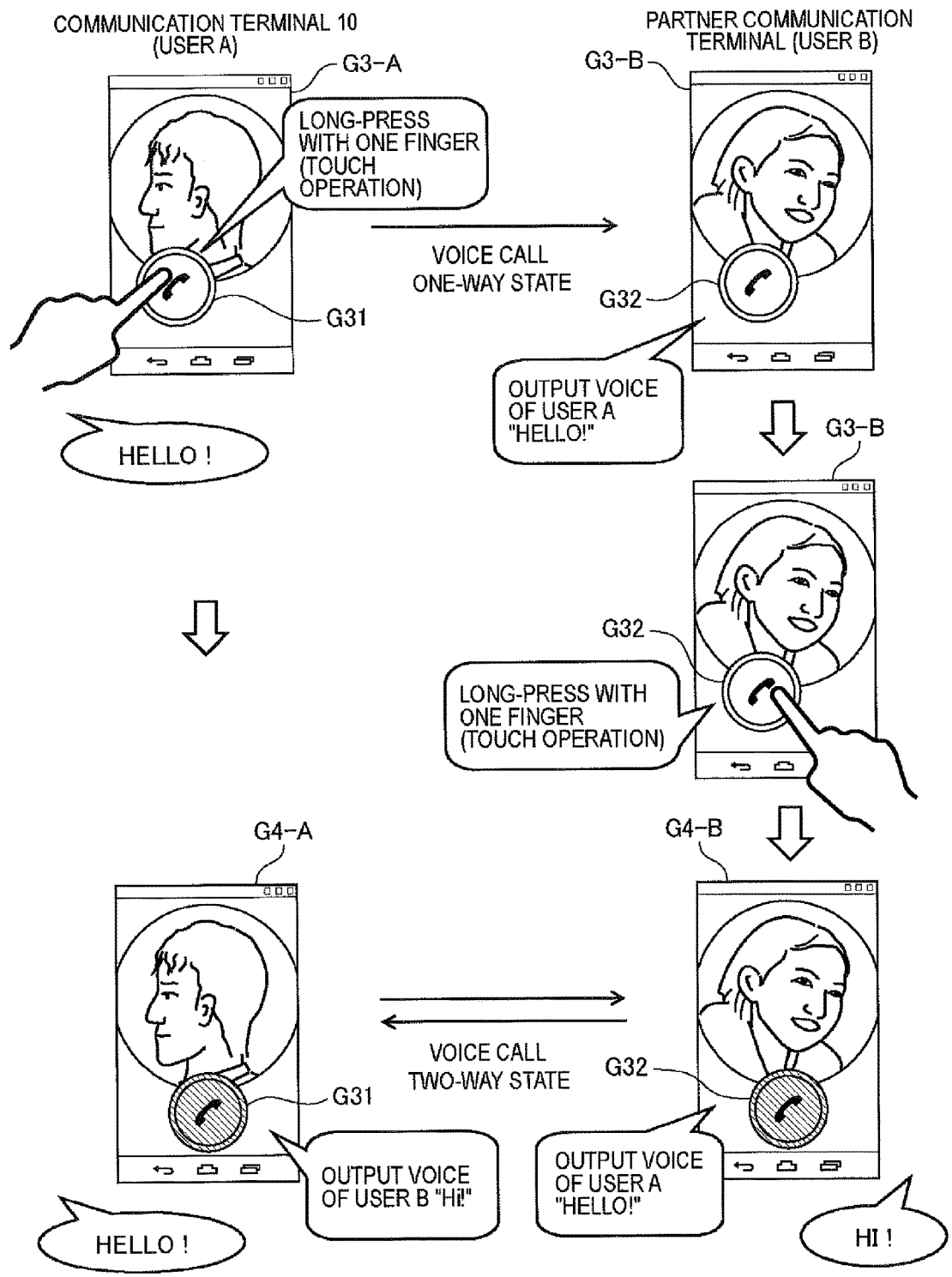
FIG. 8B is a diagram illustrating a transition of a display screen when a voice call is used.

FIG. 8B is a diagram illustrating a transition of the display screen when a voice call is used. In this case, as shown in FIG. 8A, the communication terminal 10 and the partner communication terminal have already executed the terminal operation communication in a two-way state. Thus, for example, the communication terminal 10 determines the switching permission range to be a voice call, a video call and a paint call.

The communication terminal 10 detects the user A's operation (touch operation) for long-pressing the display screen G2-A with one finger, as the user's operation corresponding to a voice call (S72). Since the voice call is within the switching permission range, the communication terminal 10 identifies the voice call as current user-to-user communication means, and displays a view element G31 indicating the voice call (display screen G3-A). Further, the communication terminal 10 starts up the microphone unit 8, and acquires voice data indicating a voice of the user A collected by the microphone unit 8, as communication media data (S76). The communication terminal 10 transmits type request information indicating the voice call and the voice data to the partner communication terminal (S77).

The partner communication terminal receives the type request information and the voice data (S81), displays a view element G32 indicating a voice call similar to that of the communication terminal 10 (display screen G3-B), and outputs a voice of the user A from the speaker unit 9 on the basis of the received voice data (S82, S83). The user B can know that the user A requests a voice call, through the display of the view element G32 and the output of the user A's voice. However, in this case, the partner communication terminal still stops a process of acquiring the voice data of the user B. Thus, in this stage, only the voice of the user A is output from the partner communication terminal, and the voice of the user B is not transmitted to the communication terminal 10.

When approving a voice call to the user A in a two-way state, the user B may perform the same user's operation as that of the user A to the view element G32 displayed on the partner communication terminal. When the user's operation is detected (S84), the partner communication terminal starts a process of acquiring the voice data of the user B (S87). The partner communication terminal transmits type request information indicating the voice call and the acquired voice data to the communication terminal 10 (S88). Thereby, the communication terminal 10 outputs the voice of the user B from the speaker unit 9 on the basis of the received voice data. In this case, as shown in display screens G4-A and G4-B, the communication terminal 10 may change (discolor, deform or the like) the view elements G31 and G32 in order to indicate that the voice call is executed in a two-way state.

In this manner, in an original voice call, two-way communication is general, whereas, in the first example, a one-way state is provided even in the communication stage of a voice call. Thereby, after a user listens to a voice of a partner, the user can determine whether to perform a two-way voice call, and can start a voice call with ease. In addition, in such a situation as that in which a user does not desire to let a partner hear the user's own voice or an environmental sound, but deems listening to a voice of the partner to be acceptable, such a one-way voice call serves as user-to-user communication means easy to use.

FIG. 8C is a diagram illustrating a transition of the display screen when a video call is used. In this case, for example, the communication terminal 10 determines the switching permission range to be a voice call, a video call and a paint call.

The communication terminal 10 detects the user A's operation (touch operation) which performs long-press with two fingers, as a user's operation corresponding to a video call (S72). Since the video call is within the switching permission range, the communication terminal 10 identifies the video call as current user-to-user communication means, and displays a view element G51 indicating the video call (display screen G5-A). Further, the communication terminal 10 starts up the imaging unit 7 and the microphone unit 8, and acquires moving image data and voice data indicating a moving image captured by the imaging unit 7, as communication media data (S76). The communication terminal 10 transmits type request information indicating the video call, the voice data and the moving image data to the partner communication terminal (S77).

The partner communication terminal receives the type request information, the voice data and the moving image data (S81), displays a view element G52 indicating a video call similar to that of the communication terminal 10 (display screen G5-B), outputs a voice of the user A from the speaker unit 9 (S82; S83), and outputs an image captured by the communication terminal 10 on the basis of the received moving image data (S83). Thereby, the user B can know that the user A requests a video call. However, in this case, the partner communication terminal still stops a process of acquiring the voice data and the moving image data. Thus, in this stage, only the voice and moving image of the user A are output from the partner communication terminal, and the voice and moving image of the user B are not transmitted to the communication terminal 10.

When the user B approves a video call to the user A in a two-way state, the user may perform the same user's operation as that of the user A to the view element G52 displayed on the partner communication terminal. When the user's operation is detected (S84), the partner communication terminal starts to acquire the voice data and the moving image data (S87). The partner communication terminal then transmits the type request information indicating the video call, the voice data and the moving image data to the communication terminal 10 (S88). Thereby, the communication terminal 10 outputs the voice of the user B from the speaker unit 9, and outputs an image captured by the partner communication terminal. In this case, the communication terminal 10 replaces the view elements, shown in the display screens G1-A and G1-B, which are displayed as the user A and the user B, with moving images as shown in display screens G6-A and G6-B, respectively.

In this manner, in the first example, a one-way state is provided even in the communication stage of a video call. Thereby, a user views and listens to the voice and projected image of a partner, and then can determine whether to perform a two-way video call, and can start the video call with ease.

FIG. 8D is a diagram illustrating a transition of the display screen when a paint call is used. In this case, for example, the communication terminal 10 determines the switching permission range to be a voice call, a video call and a paint call.

The communication terminal 10 detects a user's operation corresponding to a paint call (S72). The user's operation corresponding to the paint call is, for example, a selection operation to a menu or buttons of a paint tool. Since the paint call is within the switching permission range, the communication terminal 10 identifies the paint call as current user-to-user communication means. Similarly to the video call, the communication terminal 10 acquires moving image data and voice data, and acquires trace information of a user's paint operation using the paint tool (S76). In FIG. 8D, trace information indicating a paint trace G71 on a display screen G7-A is acquired. The communication terminal 10 transmits type request information indicating the paint call, the voice data, the moving image data and the trace information of the paint operation to the partner communication terminal (S77).

The partner communication terminal receives the type request information, the voice data, the moving image data and the trace information of the paint operation (S81), outputs a voice and a moving image similarly to the video call (S83), and displays and outputs a paint trace indicated by the trace information of the paint operation (S83). Thereby, the partner communication terminal displays the same paint trace G72 as the paint trace displayed in the communication terminal 10.

When the user B also desires to paint for himself, the user B may execute a user's operation corresponding to the paint operation as mentioned above, and may perform the paint operation. Thereby, the partner communication terminal starts to acquire the voice data, the moving image data and the trace information of the paint operation (S87). In FIG. 8D, trace information indicating a paint trace G73 of the user B is acquired. The partner communication terminal transmits the type request information indicating the paint call, the voice data, the moving image data and the trace information of the paint operation to the communication terminal 10 (S88). Thereby, the communication terminal 10 outputs the voice and moving image of the user B, and displays and outputs a paint trace (G74) of the paint operation performed by the user B.

In this manner, in the first example, the user-to-user communication means (paint call) for exchanging the paint trace together with the voice and the moving image is provided. According to the paint call, information difficult to transmit to a user by a voice or a moving image can be simply and rapidly transmitted to a partner. For example, when a user desires to inform a partner of a specific one of clothes which are reflected in a moving image, a paint operation for marking a position in which the specific one is reflected is performed, thereby allowing the specific one of clothes to be immediately transmitted to a partner. In this manner, according to the paint call, it is possible to share real-time writing information between users. Therefore, according to the first example, it is possible to provide convenient user-to-user communication means.

[Operational Effects Of First Example]

As described above, in the first example, a rank (level) corresponding to the degree of intimacy between users during communication is given to four types of user-to-user communication means, on the basis of the level of privacy of information to be exchanged. The range of user-to-user communication means available in each point of time is determined depending on such a rank.

Therefore, according to the first example, it is possible to prevent the situation in which, in spite of users not agreeing with each other on the use of user-to-user communication means for exchanging information having lowest privacy, the use of user-to-user communication means for exchanging information having high privacy is suddenly requested. As a result, according to the first example, multiple types of user-to-user communication means can not only be transferred seamlessly, but also communication can be reliably taken by users. That is, according to the first example, it is possible to improve the usability of user-to-user communication means using communication terminals.

In addition, in the first example, when the use of a certain user-to-user communication means is requested, the communication media data which is sent from the partner communication terminal is output, but a process of acquiring the communication media data of a user of the communication terminal itself is stopped until a specific user's operation is detected. Thereby, in the first example, the execution state of the user-to-user communication means is provided with a one-way state. Therefore, according to the first example, a user can determine whether to send information having high privacy of the user's own voice, video or the like on the basis of privacy information of a partner, and can reliably take communication.

In addition, in the first example, the terminal operation communication is provided as user-to-user communication means of a first stage. In this terminal operation communication, the contents of the user's operation of the communication terminal 10 are transmitted to the partner communication terminal, and are output as presentation contents corresponding to the contents of the user's operation by the partner communication terminal. Therefore, according to the first example, it is possible to cause a user to obtain an agreement from a partner through the terminal operation communication in which personal information is not used at all, and then to perform a transition to user-to-user communication means for exchanging information having high privacy. That is, according to the first example, it is possible to provide most suitable means to start the user-to-user communication.

In addition, in the first example, in a start screen displayed in order to cause a user to select a communication partner, plural view elements indicating plural communication partner candidates are drawn in positions and forms each corresponding to a relationship between the user of the communication terminal 10 itself and each communication partner candidate. Thereby, according to the first example, since a relationship between the communication partner and the user are clarified in accordance with a view position and a view form, the communication partner can be easily selected, and the motivation of communication start is facilitated.

Second Example

In a second example, regarding the switching of user-to-user communication means, a user interface different from that in the first example is provided. Hereinafter, a communication terminal 10 in the second example will be described with a focus on contents different from those in the first example. In the following description, the same contents as those in the first example will be not repeated.

[Device Configuration and Processing Configuration]

The device configuration (see FIG. 3) and the process configuration (see FIG. 5) of the communication terminal 10 in the second example are the same as those in the first example.

The display control unit 12 displays a display screen on which each view element indicating a user of the communication terminal 10 itself and another user selected as a communication partner is drawn, on the monitor of the display unit 4. Further, the display control unit 12 changes a positional relationship between the view element indicating the user of the communication terminal 10 itself and included in the display screen and the view element indicating the user of the partner communication terminal, on the basis of the type request information received by the receiving unit 17. The details of the display screen itself in such a second example will be described later. In addition, in the second example, the view element itself indicating each user is not limited.

The operation detection unit 13 detects a user's operation for changing a distance between the view element indicating the user of the communication terminal 10 itself and the view element indicating another user, which are included in the display screen. This detected user's operation includes an operation for bringing the view elements close to each other, an operation for separating the view elements from each other, or the like.

When the operation detection unit 13 detects the user's operation for changing a distance between the view elements as described above, the type identifying unit 14 identifies another type of user-to-user communication means different from the type of current user-to-user communication means which is being executed between the user of the communication terminal 10 itself and another user, in accordance with a change in the distance, or determines to stop executing the current user-to-user communication means. For example, when the user's operation for bringing the view elements of the respective users close to each other is detected, the type identifying unit 14 identifies user-to-user communication means having privacy higher than that of the current user-to-user communication means. Reversely, when the user's operation for separating the view elements of the respective users from each other is detected, the type identifying unit 14 identifies user-to-user communication means having privacy lower than that of the current user-to-user communication means, or determines to stop executing the current user-to-user communication means. In addition, when a certain user-to-user communication means is being executed in a two-way state, and the user's operation for separating the view elements of the respective users from each other is detected, the type identifying unit 14 may cause the user-to-user communication means to transition to a state where the communication means is executed in a one-way state. For example, when a voice call is being executed in a two-way state, the type identifying unit 14 may stop a process of acquiring voice data and a process of transmitting the voice data, and may only output a voice of the user of the partner communication terminal.

[Operation Example]

<<Communication Method>>

A communication method in the second example is the same as that in the first example as shown in FIGS. 7A and 7B. For example, the user's operation for changing a distance between the view elements as described above is detected in (S72) of FIG. 7A, and the identifying of new user-to-user communication means is performed in (S75) of FIG. 7A. In addition, the change of a display position between the view elements is executed in (S82) of FIG. 7B.

<<Screen Control Method>>

Figure 9A:
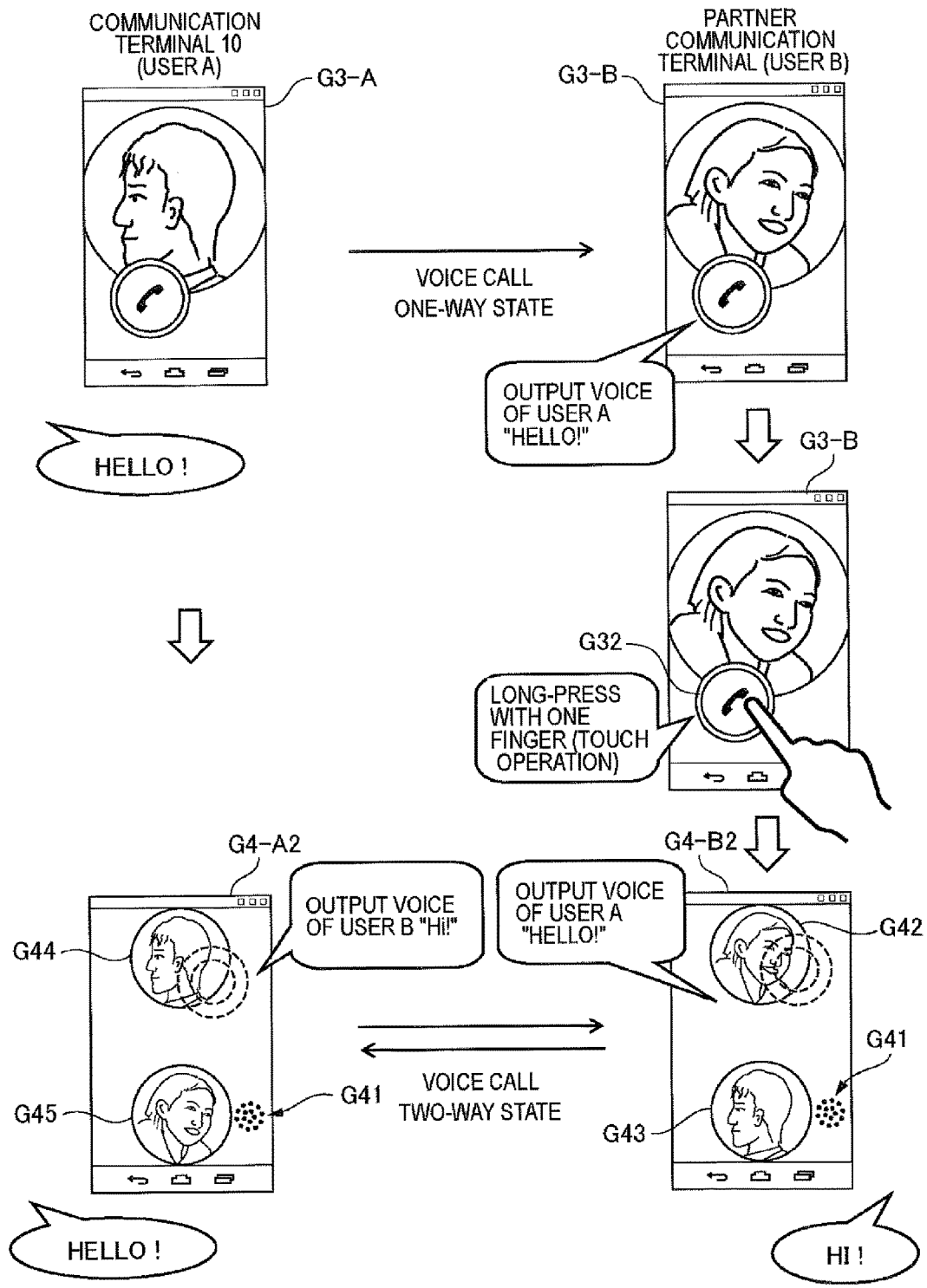
FIG. 9A is a diagram illustrating a transition of a display screen when a voice call is used, in a second example.
Figure 9B:
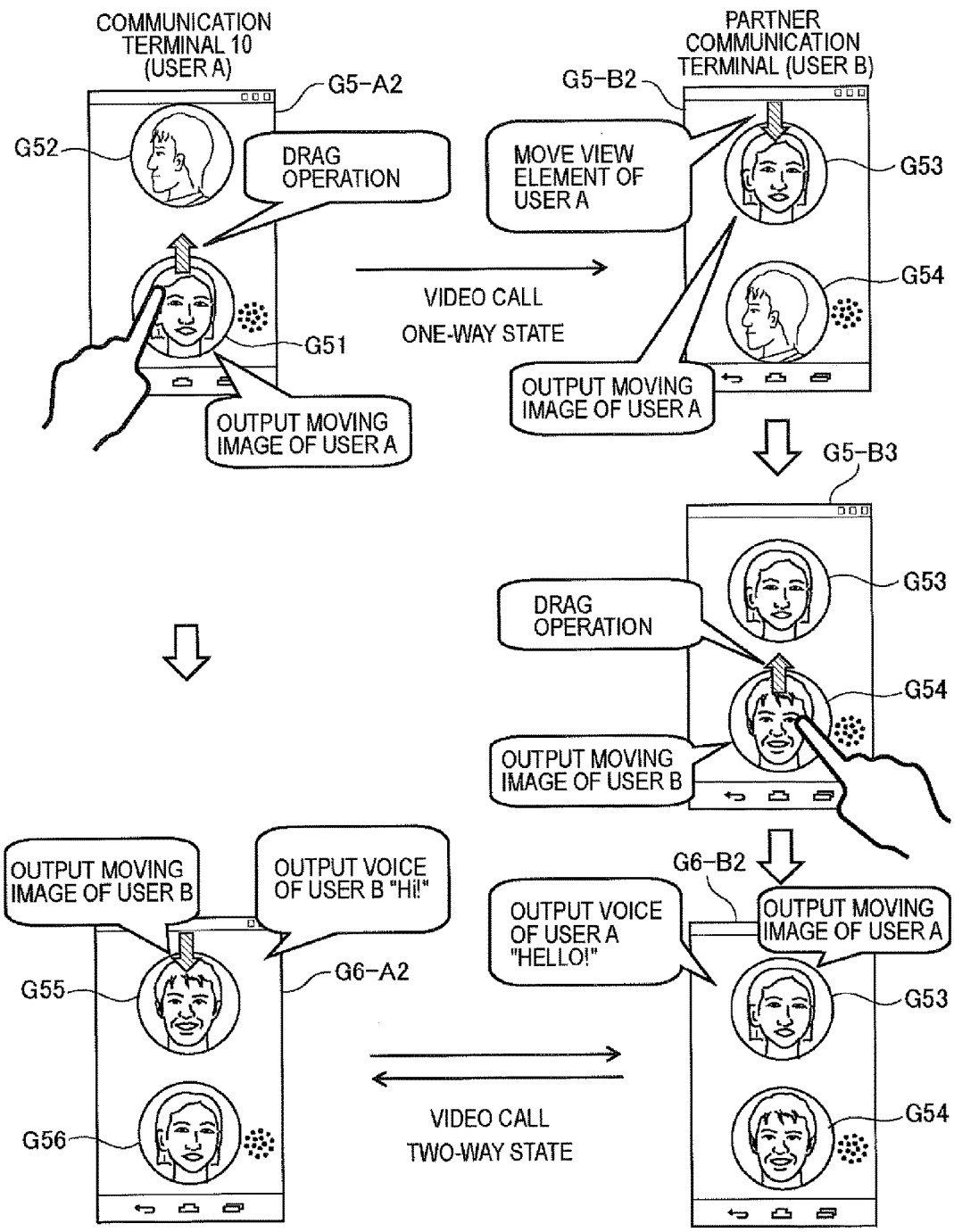
FIG. 9B is a diagram illustrating a transition of a display screen when a video call is used, in the second example.

Hereinafter, a screen control method in the second example will be described with reference to FIGS. 9A, 9B and 10. FIGS. 9A, 9B and 10 are diagrams illustrating transitions of display screens which are controlled in the communication terminal 10 of the second example. Hereinafter, an execution subject of the screen control method is described as the communication terminal 10, but the execution subject may be each unit of the communication terminal 10. In addition, hereinafter, the transitions of the display screens will be described in appropriate association with each step of the operation of the communication terminal 10 shown in FIGS. 7A and 7B.

FIG. 9A is a diagram illustrating a transition of the display screen when a voice call is used in the second example. In this case, it is assumed that, as shown in FIG. 8A, the communication terminal 10 and the partner communication terminal have already executed the terminal operation communication in a two-way state, and determine the switching permission range to be a voice call, a video call and a paint call. Similarly to the first example, the communication terminal 10 displays the display screen G3-A, and the partner communication terminal displays the display screen G3-B.

The partner communication terminal detects the user B's operation (touch operation) for long-pressing the view element G32 of the display screen G3-B with one finger, as a user's operation corresponding to a voice call (S84). When the user's operation is detected (S84), the partner communication terminal starts to acquire voice data of the user B (S87), and displays a display screen G4-B2 shown in FIG. 9A. In the display screen G4-B2, a view element G42 indicating the user A serving as a communication partner and a view element G43 indicating the user B of the partner communication terminal are displayed apart from each other by a predetermined distance. In addition, a view element G41 indicating a microphone is displayed near the view element G43 indicating the user B. The partner and the user's self have a tendency to be distinguished from each other by this view element G41.

On the other hand, the communication terminal 10 outputs a voice of the user B from the speaker unit 9 on the basis of the voice data which is sent from the partner communication terminal. In this case, the communication terminal 10 displays a display screen G4-A2. In the display screen G4-A2, similarly to the display screen G4-B2, a view element G44 indicating the user B serving as a communication partner and a view element G45 indicating the user A of the communication terminal 10 are displayed apart from each other by a predetermined distance. Further, the view element G41 indicating a microphone is displayed near the view element G45 indicating the user A.

FIG. 9B is a diagram illustrating a transition of the display screen when a video call is used in the second example. In this case, for example, the communication terminal 10 determines the switching permission range to be a voice call, a video call and a paint call.

The communication terminal 10 detects an operation (drag operation) for bringing the view element G51 indicating the user A of the communication terminal 10 itself in a display screen G5-A2 close to the view element G52 indicating the user B, as a user's operation corresponding to a video call (S72). In the example of FIG. 9B, since the view elements G51 and G52 are displayed vertically apart from each other, an operation for pulling up the view element G51 upward is detected.

Since the video call is within the switching permission range, the communication terminal 10 identifies the video call as current user-to-user communication means, and acquires moving image data indicating a moving image captured by the imaging unit 7 and voice data, as communication media data (S76). In this case, the communication terminal 10 displays the moving image captured by the imaging unit 7 within the view element G51 indicating the user A. Thereby, according to the display screen G5-A2, since a moving image is displayed in the view element G51 indicating the user A, and a still image is displayed in view element G52 indicating the user B, the communication terminal 10 can cause the user A to easily ascertain that the video call is in a one-way state.

The partner communication terminal receives type request information indicating the video call, the voice data and the moving image data (S81), and outputs the moving image and voice of the user A (S82). In this case, in a display screen G5-B2, the partner communication terminal brings a view element G53 indicating the user A of a communication partner close to a view element G54 indicating the user B, and displays a moving image of the user A within the view element G53. Thereby, according to the display screen G5-B2, since a moving image is displayed in the view element G53 indicating the user A, and a still image is displayed in the view element G54 indicating the user B, the partner communication terminal can cause the user B to easily ascertain that the use of a video call is requested from the communication partner.

When the user B approves a video call to the user A in a two-way state, the user may perform a user's operation for bringing the view element G54 of the user's self displayed on the partner communication terminal close to the view element G53 indicating the user A. When the user's operation is detected (S84), the partner communication terminal starts to acquire voice data and moving image data (S87), and displays a moving image captured by the imaging unit 7 within the view element G54 indicating the user B (display screens G5-B3 and G6-B2). Thereby, since a moving image of the user A is displayed in the view element G53, and a moving image of the user B is displayed in the view element G54, the partner communication terminal can cause the user B to easily ascertain that a two-way state of the video call is started.

In this case, the communication terminal 10 outputs a voice of the user B, brings a view element G55 indicating the user B close to a view element G56 indicating the user A in a display screen G6-A2, and displays a moving image of the user B within the view element G55 indicating the user B.

FIG. 10 is a diagram illustrating a transition of the display screen when a video call is used in a two-way state, in the second example. The communication terminal 10 in the second example can also transmit an operation of the expansion or reduction of a display region of a moving image to the partner communication terminal in a video call. First, as shown in the display screens G6-A2 and G6-B2, it is assumed that in the communication terminal 10 and partner communication terminal, a video call is used in a two-way state.

When the user B's operation (pinch-out operation) for expanding a view element G58 indicating the user B's self is detected, the partner communication terminal expands and displays the view element G58 (view element G59). The partner communication terminal transmits information indicating that the expansion operation is performed and resize information indicating a size after expansion, to the communication terminal 10.

Thereby, the communication terminal 10 expands and displays the view element G55 indicating the user B, to a size indicated by the received resize information (view element G60). Such control is similarly executed on the partner communication terminal from the communication terminal 10. Further, the control is similarly executed on an operation for reducing a view element indicating a user.

Further, when the user A's operation for separating the view element G56 indicating the user A's self from the view element G60 indicating the user B is detected, the communication terminal 10 terminates the user-to-user communication between the user A and the user B. The user's operation detected herein is equivalent to the detection (S73) of the termination operation shown in FIG. 7A or the detection (S85) of the termination operation shown in FIG. 7B. In addition, the communication terminal 10 may perform switching to user-to-user communication means lower than the current user-to-user communication means rather than the termination of user-to-user communication, by the detection of the user's operation. In the example of FIG. 10, the communication terminal 10 may perform switching to a voice call which is one level lower than a video call.

[Operational Effects Of Second Example]

As described above, in the second example, when users agree with each other on the use of a voice call in a two-way state, two view elements indicating both users are displayed on the communication terminal 10 and the partner communication terminal. In the communication terminal 10, by the detection of a user's operation in which a view element indicating a user of the communication terminal 10 itself is brought close to a view element indicating a partner user, a video call is identified, a process of acquiring voice data and moving image data is started, and the voice data and the moving image data are transmitted to the partner communication terminal. In the partner communication terminal, in association with the reception of the voice data and the moving image data which are transmitted from the communication terminal 10, display control is performed so that the view element indicating the user of the communication terminal 10 comes close to the view element indicating the user of the partner communication terminal itself. In addition, in the partner communication terminal, the use of a video call in a two-way state is started by the detection of a user's operation in which the view element indicating the user of the partner communication terminal itself is brought close to the view element indicating the user of the communication terminal 10.

In this manner, in the second example, switching of the level of user-to-user communication means associated with the degree of intimacy of a user during communication is represented by changing a distance between view elements indicating each user capable of indicating the degree of intimacy of a user. Thus, according to the second example, it is possible to realize an intuitive user interface with respect to user-to-user communication.

Third Example

As described above, the imaging unit 7 mainly includes an in-camera in which a direction toward a user is set to an imaging direction, and an out-camera in which an opposite direction to the imaging direction of the in-camera is set to an imaging direction. Any one of the in-camera and the out-camera is started up, and an image is captured by the started-up camera. The inventors have turned their attention to the fact that usage scenes are different from each other in the in-camera and the out-camera. From a difference between the usage scenes, a point of view has been obtained in which the mental states (intentions) of a user who uses a video call are different from each other in a case where the in-camera is selected and a case where the out-camera is selected. That is, a point of view has been obtained in which, when the in-camera is used, a user desires to transmit information including the user's self to a partner, that is, a dialogue with a partner, and when the out-camera is used, a user desires to transmit information other than the user's self to a partner, that is, sharing with a partner.

A communication terminal 10 in a third example provides a user interface coincident with the mental state (intention) of a user in a video call in which the in-camera and the out-camera are used. Hereinafter, the communication terminal 10 in the third example will be described with a focus on contents different from those in the first example and the second example. In the following description, the same contents as those in the first example and the second example will be not repeated.

[Device Configuration and Processing Configuration]

The device configuration (see FIG. 3) and the process configuration (see FIG. 5) of the communication terminal 10 in the third example are the same as those in the first example and the second example.

The operation detection unit 13 detects a user's operation for moving a view element indicating a user of the communication terminal itself included in a display screen, as a switching operation of the in-camera and the out-camera. The user's operation detected herein is a movement of a view element to a direction other than a direction in which users are brought close to each other, which corresponds to a switching operation from a voice call to a video call.

When moving image data is acquired as communication media data, the data acquisition unit 15 performs switching between the in-camera and the out-camera in accordance with the detection of a user's operation performed by the operation detection unit 13.

The receiving unit 17 receives in-use camera information, indicating any one of the in-camera and the out-camera, from the partner communication terminal.

The display control unit 12 causes a display unit to display a display screen on which the view elements indicating the user of the communication terminal itself and the user of the partner communication terminal are drawn and on which an image captured by the in-camera or the out-camera is drawn as a view element indicating the user of the communication terminal itself. In this case, when the out-camera is started up, the display control unit 12 makes as large as possible a drawing region of the image, captured by the out-camera, which is displayed as a view element indicating the user of the communication terminal itself. When the moving image data which is sent from the partner communication terminal indicates the projected image of the in-camera, the display control unit 12 may make a drawing region of an image captured by the out-camera of the communication terminal 10 itself larger than a drawing region of an image displayed as the view element indicating the user of the partner communication terminal. Here, the increase or reduction of the drawing region of the image may be realized by the expansion or reduction of the image, and may be realized by the trimming amount of the image.

In addition, the display control unit 12 changes a drawing region of an image of the partner communication terminal which is displayed as the view element indicative of the user of the partner communication terminal, in accordance with the in-use camera information which is received by the receiving unit 17. For example, when the received in-use camera information indicates the out-camera, the display control unit 12 makes as large as possible the drawing region of the image captured by the out-camera which is displayed as the view element indicating the user of the partner communication terminal. For example, when the out-camera is started up in both the communication terminal 10 itself and the partner communication terminal, the display control unit 12 displays both the images so as to dividing the monitor into two parts.

The transmission unit 16 further transmits the in-use camera information indicating any one of the in-camera and the out-camera capturing the moving image data.

[Operation Example]

<<Communication Method>>

A communication method in the third example is the same as those in the first example and the second example as shown in FIGS. 7A and 7B. For example, the user's operation for switching between the in-camera and the out-camera as described above is detected in (S72) of FIG. 7A.

<<Screen Control Method>>

Figure 11:
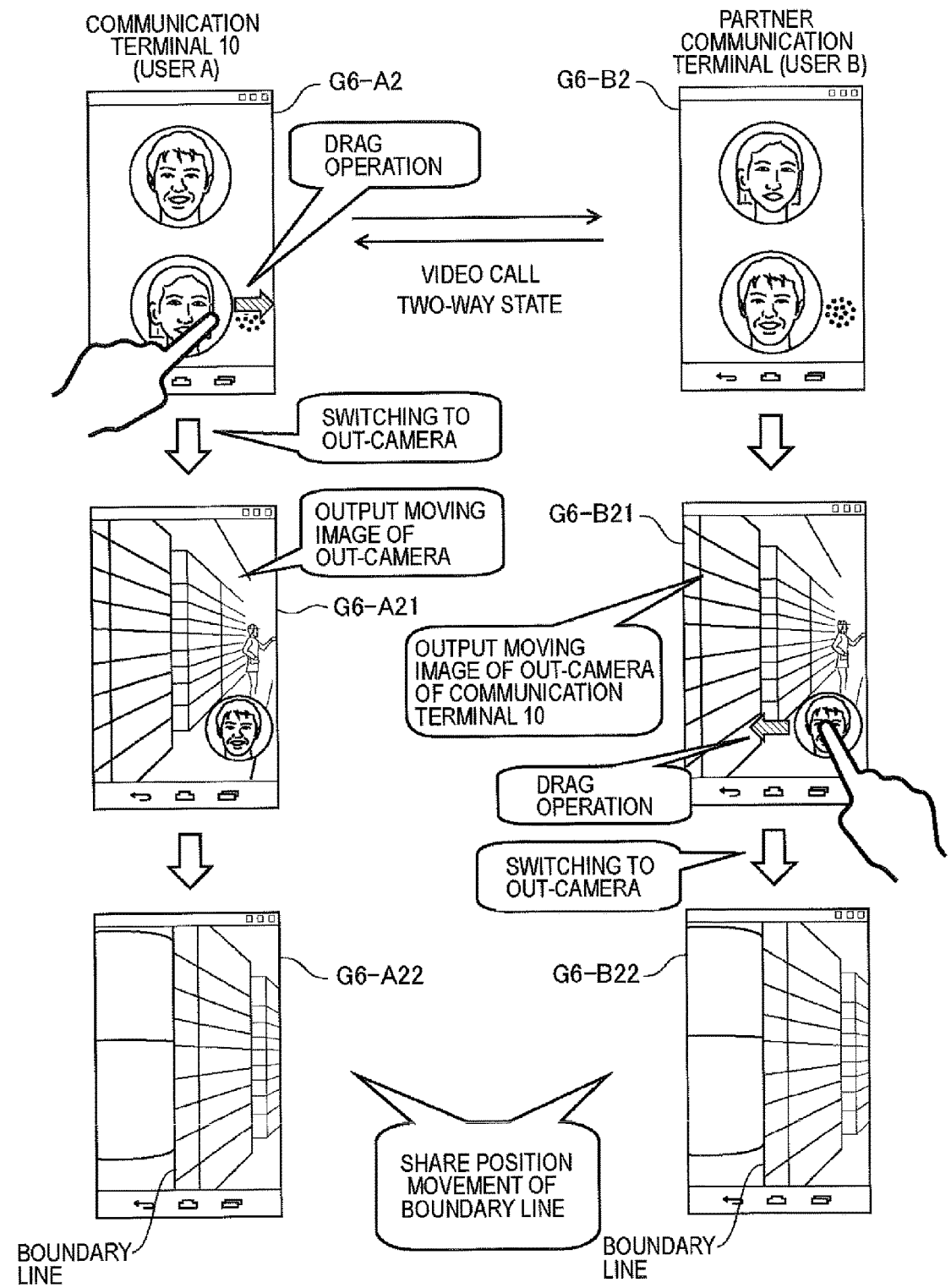
FIG. 11 is a diagram illustrating a transition of a display screen when a video call is used, in a third example.

Hereinafter, a screen control method in the third example will be described with reference to FIG. 11. FIG. 11 is a diagram illustrating a transition of a display screen which is controlled in the communication terminal 10 of the third example. Hereinafter, an execution subject of the screen control method is described as the communication terminal 10, but the execution subject may be each unit of the communication terminal 10. In addition, hereinafter, the transition of the display screen will be described in appropriate association with each step of the operation of the communication terminal 10 shown in FIGS. 7A and 7B.

FIG. 11 is a diagram illustrating a transition of a display screen when a video call is used, in the third example. In this case, the communication terminal 10 and the partner communication terminal acquires each image captured by each in-camera, and display the display screens G6-A2 and G6-B2 including each image as a view element, and have already executed a video call in a two-way state.

The communication terminal 10 detects an operation (drag operation) for moving the view element indicating the user A of the communication terminal 10 itself leftward or rightward in the display screen G6-A2, as a switching operation of the camera (S72). In association with the detection of the user's operation, the communication terminal 10 instructs the imaging unit 7 to stop the in-camera and to start up the out-camera. As shown in a display screen G6-A21, the communication terminal 10 displays the image, captured by the out-camera of the communication terminal 10 itself, on the entirety of the monitor, and displays an image which is sent from the partner communication terminal to be small. In this case, the image which is sent from the partner communication terminal is an image captured by the in-camera of the partner communication terminal. The communication terminal 10 transmits the in-use camera information indicating the out-camera to the partner communication terminal.

When the in-use camera information is received from the communication terminal 10, the partner communication terminal fully displays the image, sent from the communication terminal 10, on the monitor because the in-use camera information indicates the out-camera, and displays the image captured by the in-camera of the partner communication terminal itself to be small (display screen G6-B21).

Similarly, the user B of the partner communication terminal also moves the view element indicating the user B's self leftward or rightward, and thus can perform switching between the in-camera and the out-camera. When the user's operation for moving the view element indicating the user B leftward or rightward is detected, the partner communication terminal instructs the imaging unit 7 to stop the in-camera and to start up the out-camera. Thereby, the partner communication terminal starts to display the image captured by the out-camera of the partner communication terminal itself, as the view element indicating the user B. As shown in a display screen G6-B22, the partner communication terminal transmits the image captured by the out-camera in the partner communication terminal itself and the communication terminal 10, and thus displays both the images with the same size so as to divide the monitor into two parts (display screen G6-A22 and G6-B22).

[Operational Effects of Third Example]

In the third example, during the video call, the in-use camera information indicating any one of the out-camera and the in-camera is exchanged between the communication terminal 10 and the partner communication terminal, and the image captured by the out-camera is displayed as large as possible. Since a user who uses the out-camera desires to share information on the captured image with a partner, displaying the image captured by the out-camera large between users who communicate with each other is coincident with the intentions of both the users. On the other hand, a user who uses the in-camera may not desire to share detailed information of the user's self, and may desire to simply transmit outline information including the user's self to a partner. Consequently, in the third example, the image captured by the out-camera is displayed preferentially over the image captured by the in-camera.

In this manner, according to the third example, since each image is displayed, in the video call, with a display size coincident with a user's intention in each usage scene of the in-camera and the out-camera, it is possible to provide a user interface coincident with the mental state (intention) of a user in the video call. That is, according to the third example, the user interface coincident with the mental state of a user is provided, and thus it is possible to improve the usability of user-to-user communication means using communication terminals.

In addition, in the third example, switching between the in-camera and the out-camera is performed by an operation for moving the view element indicating the user of the communication terminal 10. Thereby, according to the third example, it is possible to facilitate an operation of switching between the in-camera and the out-camera, and to make the use of a video call easier.

[Modification Example]

In each of the aforementioned examples, a user's operation for selecting a view element indicating the communication partner candidate is detected in the start screen as shown in the example of FIG. 6, whereby the partner communication terminal is identified, and communication is established between the partner communication terminal and the communication terminal 10 itself. The start screen further includes a view element indicating the user of the communication terminal 10 itself. The communication terminal 10 may detect a user's operation for changing a distance between the view element indicating the user of the communication terminal 10 itself and a view element indicating a communication partner candidate, and may perform the specification of the partner communication terminal and the communication establishment in association with the user's operation.

In the aforementioned first example, when the user B of the partner communication terminal approves the use of each user-to-user communication means in a two-way state with the user A of the communication terminal 10, the performing of the same user's operation as that of the user A is illustrated (see FIGS. 8A, 8B and 8C). However, the partner communication terminal may start to execute user-to-user communication means in a two-way state through the detection of a user's operation different from the user's operation which is detected by the communication terminal 10. For example, in the example of FIG. 8A, the partner communication terminal may detect a one-time tapping operation as a user's operation corresponding to the terminal operation communication. In addition, in the examples of FIGS. 8B and 8C, the partner communication terminal may detect some kind of selection operation for the view element G32 or G52 as a user's operation corresponding to a voice call or a video call.

When both the images captured by each out-camera are displayed so as to divide the monitor into two parts, the communication terminal 10 in the aforementioned third example may detect a user's operation for moving a boundary between both the images. In this case, the communication terminal 10 further transmits the purport of the boundary being moved and a user's operation information indicating the amount of movement to the partner communication terminal. Thereby, the communication terminal 10 and the partner communication terminal can share each user's operation for moving the boundary, and can change the ratio between drawing ranges of the respective images in association with the operation.

In addition, in the aforementioned third example, switching between the in-camera and the out-camera is performed with the detection of the user's operation for moving the view element indicating the user, but may be performed with the detection of a user's operation for rotating the view element. In this case, the communication terminal 10 may perform switching between the in-camera and the out-camera by displaying at least the view element indicating the user of the communication terminal 10 itself in a spherical shape, and detecting a flick operation for the view element. This can make the switching operation of the camera more intuitive.

In each exemplary embodiment and each example as described above, the communication terminal 10 (type identifying units 14 and 102) on a side that makes a request for user-to-user communication determines the switching permission range in multiple types of user-to-user communication means, but the communication terminal 10 (partner communication terminal) on a side that receives a request for user-to-user communication may determine the switching permission range. Here, the communication terminal on a side that makes a request for user-to-user communication us denoted by a partner communication terminal, and the communication terminal on aside that receives a request for user-to-user communication is denoted by a communication terminal 200.

Figure 12:
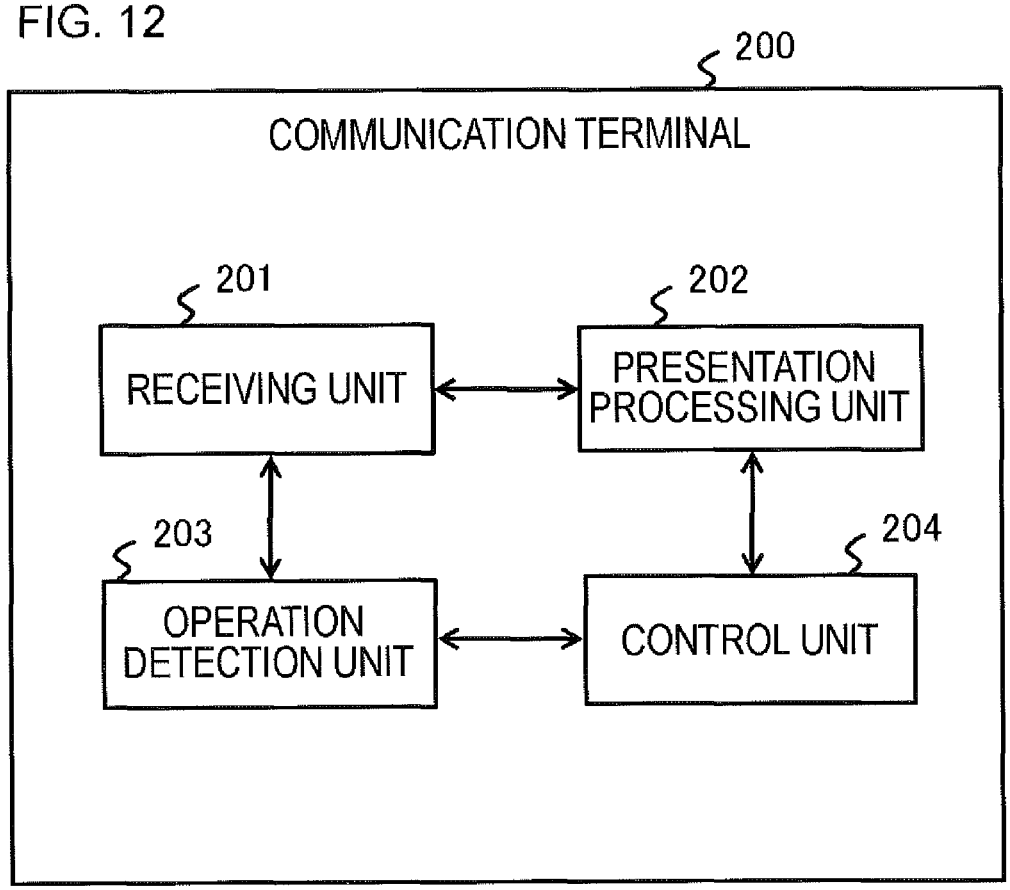
FIG. 12 is a diagram conceptually illustrating a process configuration example of a communication terminal in a modification example.

FIG. 12 is a diagram conceptually illustrating a process configuration example of a communication terminal 200 in a modification example. The communication terminal 200 in the modification example includes a receiving unit 201 that receives type request information indicating a type of user-to-user communication means and communication media data corresponding to the type of user-to-user communication means from the partner communication terminal, a presentation processing unit 202 that outputs the communication media data received by the receiving unit 201, using an output method corresponding to the type request information received by the receiving unit 201, an operation detection unit 203 that detects a user's operation of the communication terminal 200 itself, and a control unit 204 that excludes another communication media data, corresponding to another type request information which is received by the receiving unit 201 after the reception of the type request information, from output targets of the presentation processing unit 202, when a specific user's operation is not detected by the operation detection unit 203.

In this modification example, even on the assumption that communication media data (voice data and moving image data) corresponding to a video call is received from the partner communication terminal when the user's operation corresponding to the terminal operation communication is not detected, the communication media data is excluded from the output targets. In this modification example, similarly to each exemplary embodiment and each example described above, the user-to-user communication means can be switched in a stepwise manner.

Meanwhile, in plural flow diagrams used in the aforementioned description, plural steps (processes) are described in order, the execution order of each step is not limited to the described order. The order of each step shown can be changed within the range without causing any problem in terms of contents. In addition, each exemplary embodiment, each example and each modification example described above can be combined in the range consistent with the contents thereof.

Some or all of the exemplary embodiment, each example and each modification example described above may be specified as the following appendices. However, the exemplary embodiment, each example and each modification example are not limited thereto.

(Appendix 1) A communication terminal including:

an operation detection unit that detects a user's operation to the communication terminal itself;

a type identifying unit that identifies a type of user-to-user communication means corresponding to the user's operation which is detected by the operation detection unit, from types of user-to-user communication means to which switching is allowed from a type of current user-to-user communication means which is currently used, among plural types of user-to-user communication means capable of being implemented using communication between a partner communication terminal and the communication terminal itself;

a data acquisition unit that acquires communication media data of a user of the communication terminal itself, which corresponds to the type of user-to-user communication means identified by the type identifying unit; and a transmission unit that transmits type request information indicating the type of user-to-user communication means identified by the type identifying unit and the communication media data acquired by the data acquisition unit, to the partner communication terminal, wherein the type identifying unit determines a range of the types of user-to-user communication means to which switching is allowed from the type of current user-to-user communication means, in accordance with a status of response from the partner communication terminal with respect to the type request information transmitted to the partner communication terminal.

(Appendix 2) The communication terminal according to appendix 1, further including:

a receiving unit that receives the type request information and the communication media data from the partner communication terminal; and a presentation processing unit that outputs communication media data which is received by the receiving unit, using an output method corresponding to the type request information which is received by the receiving unit, wherein the data acquisition unit stops a process of acquiring the communication media data of the user of the communication terminal itself, which corresponds to the type request information received by the receiving unit, until a specific user's operation is detected by the operation detection unit.

(Appendix 3) The communication terminal according to appendix 1 or 2, wherein the type identifying unit identifies terminal operation communication as the type of user-to-user communication means, the data acquisition unit generates, as the communication media data, terminal operation information indicating contents of a user's operation in the terminal operation communication on the basis of the user's operation which is detected by the operation detection unit, and the transmission unit transmits the type request information indicating the terminal operation communication and the terminal operation information generated by the data acquisition unit to the partner communication terminal.

(Appendix 4) The communication terminal according to appendix 3 further including:

a receiving unit that receives the type request information and the terminal operation information; and a presentation processing unit that outputs presentation contents corresponding to contents of a user's operation indicated by the terminal operation information, using an output method corresponding to an operation type included in the terminal operation information, when the type request information received by the receiving unit indicates the terminal operation communication.

(Appendix 5) The communication terminal according to any one of appendices 1 to 4, further including:

a display control unit that causes a display unit to display a display screen on which plural view elements indicative of plural communication partner candidates are drawn in positions and forms each corresponding to a relationship between the user of the communication terminal itself and each communication partner candidate; and a communication control unit that establishes communication between at least one partner communication terminal corresponding to at least one view element selected from the view elements by a user's operation to the display screen and the communication terminal itself.

(Appendix 6) The communication terminal according to any one of appendices 1 to 5, further including a display control unit that causes a display unit to display a display screen on which view elements indicating the user of the communication terminal itself and another user are drawn, wherein the operation detection unit detects a user's operation for changing a distance between a view element indicating the user of the communication terminal itself and a view element indicating said another user which are included in the display screen, and the type identifying unit identifies another type of user-to-user communication means different from the type of current user-to-user communication means which is executed between the user of the communication terminal itself and said another user or determines to stop executing the current user-to-user communication means in accordance with a change in a distance indicated by the user's operation which is detected by the operation detection unit.

(Appendix 7) The communication terminal according to any one of appendices 1 to 6, further including:

a receiving unit that receives the type request information from the partner communication terminal; and a display control unit that causes a display unit to display a display screen on which view elements indicating the user of the communication terminal itself and a user of the partner communication terminal are drawn, wherein the display control unit changes a positional relationship between the view element indicating the user of the communication terminal itself and the view element indicating the user of the partner communication terminal, which are included in the display screen, on the basis of the type request information received by the receiving unit.

(Appendix 8) The communication terminal according to any one of appendices 1 to 7, wherein the operation detection unit further detects a paint operation to a display unit as the user's operation, the data acquisition unit further acquires trace information of the paint operation as the communication media data, and the transmission unit further transmits the trace information of the paint operation.

(Appendix 9) The communication terminal according to any one of appendices 1 to 8, further including a display control unit that causes a display screen to display a display screen on which view elements indicating the user of the communication terminal itself and the user of the partner communication terminal are drawn and on which an image captured by an in-camera or an out-camera is drawn as the view element indicating the user of the communication terminal itself, wherein the operation detection unit detects a user's operation for moving the view element indicating the user of the communication terminal itself which is included in the display screen, and the data acquisition unit performs switching between the in-camera and the out-camera, in accordance with the detection of the user's operation performed by the operation detection unit, when moving image data is acquired as the communication media data.

(Appendix 10) The communication terminal according to appendix 9, further including a receiving unit that receives in-use camera information indicating anyone of the in-camera and the out-camera from the partner communication terminal, wherein the display control unit changes a drawing region of an image of the partner communication terminal as the view element indicating the user of the partner communication terminal, in accordance with the in-use camera information which is received by the receiving unit.

(Appendix 11) A communication terminal including:

a receiving unit that receives type request information indicating a type of user-to-user communication means and communication media data corresponding to the type of user-to-user communication means from a partner communication terminal;

a presentation processing unit that outputs the communication media data which is received by the receiving unit, using an output method corresponding to the type request information which is received by the receiving unit;

an operation detection unit that detects a user's operation to the communication terminal itself; and a control unit that excludes another communication media data corresponding to another type request information which is received by the receiving unit after the reception of the type request information, from output targets of the presentation processing unit, when a specific user's operation is not detected by the operation detection unit.

(Appendix 12) A communication method which is executed by a communication terminal, including:

detecting a user's operation to the communication terminal;

identifying a type of user-to-user communication means corresponding to the detected user's operation, from types of user-to-user communication means to which switching is allowed from a type of current user-to-user communication means which is currently used, among plural types of user-to-user communication means capable of being implemented using communication between a partner communication terminal and the communication terminal;

acquiring communication media data of a user of the communication terminal, which corresponds to the identified type of user-to-user communication means; and transmitting type request information indicating the identified type of user-to-user communication means and the acquired communication media data, to the partner communication terminal, wherein said identifying the type of user-to-user communication means includes determining a range of the types of user-to-user communication means to which switching is allowed from the type of current user-to-user communication means, in accordance with a status of response from the partner communication terminal with respect to the type request information transmitted to the partner communication terminal.

(Appendix 13) A communication method according to appendix 12, further including:

receiving the type request information and the communication media data from the partner communication terminal;

outputting the received communication media data using an output method corresponding to the received type request information; and stopping a process of acquiring communication media data of a user of the communication terminal itself, which corresponds to the received type request information, when a specific user's operation is detected.

(Appendix 14) The communication method according to appendix 12 or 13, wherein said identifying the type of user-to-user communication means includes identifying terminal operation communication as the type of user-to-user communication means, said acquiring the communication media data includes generating, as the communication media data, terminal operation information indicative of contents of a user's operation in the terminal operation communication on the basis of the detected user's operation, and said transmitting the communication media data includes transmitting the type request information indicating the terminal operation communication and the generated terminal operation information to the partner communication terminal.

(Appendix 15) The communication method according to appendix 14, further including:

receiving the type request information and the terminal operation information; and outputting presentation contents corresponding to contents of a user's operation indicated by the terminal operation information, using an output method corresponding to an operation type included in the terminal operation information, when the received type request information indicates the terminal operation communication.

(Appendix 16) The communication method according to any one of appendices 12 to 15, further including:

causing a display unit to display a display screen on which plural view elements of plural communication partner candidates are drawn in positions and forms each corresponding to a relationship between the user of the communication terminal itself and each communication partner candidate; and establishing communication between at least one partner communication terminal corresponding to at least one view element selected from the plural view elements by a user's operation to the display screen and the communication terminal itself.

(Appendix 17) The communication method according to any one of appendices 12 to 16, further including:

causing a display unit to display a display screen on which view elements indicating the user of the communication terminal itself and another user are drawn;

detecting a user's operation for changing a distance between a view element indicating the user of the communication terminal itself and a view element indicating said another user, which are included in the display screen; and identifying another type of user-to-user communication means different from the type of current user-to-user communication means which is executed between the user of the communication terminal itself and said another user or determining to stop executing the current user-to-user communication means in accordance with a change in a distance indicated by the detected user's operation.

(Appendix 18) The communication method according to any one of appendices 12 to 17, further including:

receiving the type request information from the partner communication terminal;

causing a display unit to display a display screen on which view elements indicating the user of the communication terminal itself and a user of the partner communication terminal are drawn; and changing a positional relationship between the view element indicating the user of the communication terminal itself and the view element indicating the user of the partner communication terminal, which are included in the display screen, on the basis of the received type request information.

(Appendix 19) The communication method according to any one of appendices 12 to 18, wherein said detecting the user's operation includes further detecting a paint operation to a display unit as the user's operation, said acquiring the communication media data includes further acquiring trace information of the paint operation as the communication media data, and said transmitting the communication media data includes further transmitting the trace information of the paint operation.

(Appendix 20) The communication method according to any one of appendices 12 to 19, further including:

causing a display screen to display a display screen on which view elements indicating the user of the communication terminal itself and the user of the partner communication terminal are drawn and on which an image captured by an in-camera or an out-camera is drawn as the view element indicating the user of the communication terminal itself;

detecting a user's operation for moving the view element indicating the user of the communication terminal itself, which is included in the display screen; and performing switching between the in-camera and the out-camera in accordance with the detection of the user's operation, when moving image data is acquired as the communication media data.

(Appendix 21) The communication method according to appendix 20, further including:

receiving in-use camera information indicating any one of the in-camera and the out-camera from the partner communication terminal; and changing a drawing region of an image of the partner communication terminal as the view element indicating the user of the partner communication terminal, in accordance with the received in-use camera information.

(Appendix 22) A communication method which is executed by a communication terminal, including:

receiving type request information indicating a type of user-to-user communication means and communication media data corresponding to the type of user-to-user communication means from a partner communication terminal;

outputting the received communication media data using an output method corresponding to the received type request information;

detecting a user's operation to the communication terminal itself; and excluding another communication media data corresponding to another type request information which is received after the reception of the type request information, from output targets of the communication media data, when a specific user's operation is not detected.

(Appendix 23) A communication terminal including:

a receiving unit that receives type request information indicating a type of user-to-user communication means and communication media data corresponding to the type of user-to-user communication means from a partner communication terminal;

a presentation processing unit that outputs the communication media data received by the receiving unit, using an output method corresponding to the type request information received by the receiving unit;

an operation detection unit that detects a specific user's operation for consenting to use the user-to-user communication means corresponding to the type request information received by the receiving unit;

a data acquisition unit that stops a process of acquiring communication media data of a user of the communication terminal itself, corresponding to the type request information received by the receiving unit, until the specific user's operation is detected by the operation detection unit, and starts the process of acquiring communication media data of a user of the communication terminal itself, corresponding to the type request information received by the receiving unit, when the specific user's operation is detected by the operation detection unit; and a transmission unit that transmits type request information indicating a type of user-to-user communication means corresponding to the specific user's operation detected by the operation detection unit and communication media data acquired by the data acquisition unit, to the partner communication terminal.

(Appendix 24) A communication terminal including:

an operation detection unit that detects a user's operation to the communication terminal itself;

a data acquisition unit that generates terminal operation information indicating contents of a user's operation in terminal operation communication, on the basis of a user's operation which is detected by the operation detection unit; and a transmission unit that transmits type request information indicating the terminal operation communication and the terminal operation information generated by the data acquisition unit to a partner communication terminal.

(Appendix 25) The communication terminal according to appendix 24, further including:

a receiving unit that receives the type request information indicating the terminal operation communication and terminal operation information indicating contents of a user's operation to the partner communication terminal from the partner communication terminal; and a presentation processing unit that outputs presentation contents corresponding to contents of a user's operation indicated by the terminal operation information, using an output method corresponding to an operation type included in the terminal operation information, when the type request information received by the receiving unit indicates the terminal operation communication.
(Appendix 26) A communication method which is executed by a communication terminal, including:
  receiving type request information indicating a type of user-to-user communication means and communication media data corresponding to the type of user-to-user communication means from a partner communication terminal;
  outputting the received communication media data using an output method corresponding to the received type request information;
  detecting a specific user's operation for consenting to use the user-to-user communication means corresponding to the received type request information;
  stopping a process of acquiring communication media data of a user of the communication terminal itself, corresponding to the received type request information, until the specific user's operation is detected;
  starting the process of acquiring communication media data of a user of the communication terminal itself, corresponding to the received type request information, when the specific user's operation is detected; and
  transmitting type request information indicating a type of user-to-user communication means corresponding to the specific user's operation and the acquired communication media data to the partner communication terminal.
(Appendix 27) A communication method which is executed by a communication terminal, including:
  detecting a user's operation to the communication terminal itself;
  generating terminal operation information indicating contents of a user's operation in terminal operation communication, on the basis of the detected user's operation; and
  transmitting type request information indicating the terminal operation communication and the generated terminal operation information to a partner communication terminal.
(Appendix 28) The communication method according to appendix 27, further including:
  receiving the type request information indicating the terminal operation communication and terminal operation information indicating contents of a user's operation to the partner communication terminal from the partner communication terminal; and
  outputting presentation contents corresponding to contents of a user's operation indicated by the terminal operation information, using an output method corresponding to an operation type included in the terminal operation information, when the received type request information indicates the terminal operation communication.
(Appendix 29) A program causing a communication terminal to execute the communication method according to any one of appendices 12 to 22 and 26 to 28.
(Appendix 30) A computer readable recording medium having the program according to appendix 29 recorded thereon.

This application claims priority from Japanese Patent Application No. 2013-082807 filed on Apr. 11, 2013, the content of which is incorporated herein by reference in its entirety.

The invention claimed is:

1. A communication terminal comprising:
  an operation detection unit that detects a user's operation to the communication terminal itself;
  a type identifying unit that identifies a type of user-to-user communication means corresponding to the user's operation which is detected by the operation detection unit, from types of user-to-user communication means to which switching is allowed from a type of current user-to-user communication means which is currently used, among plural types of user-to-user communication means capable of being implemented using communication between a partner communication terminal and the communication terminal itself;
  a data acquisition unit that acquires communication media data of a user of the communication terminal itself, the communication media data corresponding to the type of user-to-user communication means identified by the type identifying unit; and
  a transmission unit that transmits type request information indicative of the type of user-to-user communication means identified by the type identifying unit and the communication media data acquired by the data acquisition unit, to the partner communication terminal, wherein
  the type identifying unit determines a range of the types of user-to-user communication means to which switching is allowed from the type of current user-to-user communication means, in accordance with a status of response from the partner communication terminal with respect to the type request information transmitted to the partner communication terminal.

2. The communication terminal according to claim 1, further comprising:
  a receiving unit that receives the type request information and the communication media data from the partner communication terminal; and
  a presentation processing unit that outputs the communication media data which is received by the receiving unit, using an output method corresponding to the type request information which is received by the receiving unit, wherein
  the data acquisition unit stops a process of acquiring the communication media data of the user of the communication terminal itself until a specific user's operation is detected by the operation detection unit, the communication media data corresponding to the type request information received by the receiving unit.

3. The communication terminal according to claim 1, wherein
  the type identifying unit identifies terminal operation communication as the type of user-to-user communication means,
  the data acquisition unit generates, as the communication media data, terminal operation information indicative of contents of a user's operation in the terminal operation communication on the basis of the user's operation which is detected by the operation detection unit, and
  the transmission unit transmits the type request information indicative of the terminal operation communication and the terminal operation information generated by the data acquisition unit to the partner communication terminal.

4. The communication terminal according to claim 3 further comprising:
  a receiving unit that receives the type request information and the terminal operation information; and
  a presentation processing unit that outputs presentation contents corresponding to contents of a user's operation indicated by the terminal operation information, using an output method corresponding to an operation type included in the terminal operation information, when the type request information received by the receiving unit indicates the terminal operation communication.

5. The communication terminal according to claim 1, further comprising:
- a display control unit that causes a display unit to display a display screen on which a plurality of view elements indicative of a plurality of communication partner candidates are drawn in positions and forms each corresponding to a relationship between the user of the communication terminal itself and each communication partner candidate; and
- a communication control unit that establishes communication between at least one partner communication terminal corresponding to at least one view element selected from the plurality of view elements by a user's operation to the display screen and the communication terminal itself.

6. The communication terminal according to claim 1, further comprising
- a display control unit that causes a display unit to display a display screen on which view elements indicative of the user of the communication terminal itself and another user are drawn, wherein
- the operation detection unit detects a user's operation for changing a distance between a view element indicating the user of the communication terminal itself and a view element indicating said another user, which are included in the display screen, and
- the type identifying unit identifies another type of user-to-user communication means different from the type of current user-to-user communication means which is executed between the user of the communication terminal itself and said another user or determines to stop executing the current user-to-user communication means in accordance with a change in a distance indicated by the user's operation which is detected by the operation detection unit.

7. The communication terminal according to claim 1, further comprising:
- a receiving unit that receives the type request information from the partner communication terminal; and
- a display control unit that causes a display unit to display a display screen on which view elements indicating the user of the communication terminal itself and a user of the partner communication terminal are drawn, wherein
- the display control unit changes a positional relationship between the view element indicating the user of the communication terminal itself and the view element indicating the user of the partner communication terminal, which are included in the display screen, on the basis of the type request information received by the receiving unit.

8. The communication terminal according to claim 1, wherein
- the operation detection unit further detects a paint operation to a display unit as the user's operation,
- the data acquisition unit further acquires trace information of the paint operation as the communication media data, and
- the transmission unit further transmits the trace information of the paint operation.

9. The communication terminal according to claim 1, further comprising
- a display control unit that causes a display screen to display a display screen on which view elements indicating the user of the communication terminal itself and the user of the partner communication terminal are drawn and on which an image captured by an in-camera or an out-camera is drawn as the view element indicating the user of the communication terminal itself, wherein
- the operation detection unit detects a user's operation for moving the view element indicating the user of the communication terminal itself, which is included in the display screen, and
- the data acquisition unit performs switching between the in-camera and the out-camera, in accordance with the detection of the user's operation by the operation detection unit, when moving image data is acquired as the communication media data.

10. The communication terminal according to claim 9, further comprising
- a receiving unit that receives in-use camera information indicating any one of the in-camera and the out-camera from the partner communication terminal, wherein
- the display control unit changes a drawing region of an image of the partner communication terminal as the view element indicating the user of the partner communication terminal, in accordance with the in-use camera information which is received by the receiving unit.

11. A communication terminal comprising:
- a receiving unit that receives type request information indicating a type of user-to-user communication means and communication media data corresponding to the type of user-to-user communication means from a partner communication terminal;
- a presentation processing unit that outputs the communication media data which is received by the receiving unit, using an output method corresponding to the type request information which is received by the receiving unit;
- an operation detection unit that detects a user's operation to the communication terminal itself; and
- a control unit that excludes another communication media data corresponding to another type request information which is received by the receiving unit after the reception of the type request information, from output targets of the presentation processing unit, when a specific user's operation is not detected by the operation detection unit.

12. A communication method which is executed by a communication terminal, comprising:
- detecting a user's operation to the communication terminal;
- identifying a type of user-to-user communication means corresponding to the detected user's operation, from types of user-to-user communication means to which switching is allowed from a type of current user-to-user communication means which is currently used, among plural types of user-to-user communication means capable of being implemented using communication between a partner communication terminal and the communication terminal;
- acquiring communication media data of a user of the communication terminal, the communication media data corresponding to the identified type of user-to-user communication means; and
- transmitting type request information indicating the identified type of user-to-user communication means and the acquired communication media data, to the partner communication terminal, wherein
- said identifying the type of user-to-user communication means includes determining a range of the types of user-to-user communication means to which switching is allowed from the type of current user-to-user communication means, in accordance with a status of response from the partner communication terminal with respect to the type request information transmitted to the partner communication terminal.

13. A non-transitory computer-readable storage medium storing a program causing a communication terminal to execute a communication method, comprising:
   detecting a user's operation to the communication terminal;
   identifying a type of user-to-user communication means corresponding to the detected user's operation, from types of user-to-user communication means to which switching is allowed from a type of current user-to-user communication means which is currently used, among plural types of user-to-user communication means capable of being implemented using communication between a partner communication terminal and the communication terminal;
   acquiring communication media data of a user of the communication terminal, the communication media data corresponding to the identified type of user-to-user communication means; and
   transmitting type request information indicating the identified type of user-to-user communication means and the acquired communication media data, to the partner communication terminal, wherein
   said identifying the type of user-to-user communication means includes determining a range of the types of user-to-user communication means to which switching is allowed from the type of current user-to-user communication means, in accordance with a status of response from the partner communication terminal with respect to the type request information transmitted to the partner communication terminal.

14. A communication terminal comprising:
   a receiving unit that receives type request information indicating a type of user-to-user communication means and communication media data corresponding to the type of user-to-user communication means from a partner communication terminal;
   a presentation processing unit that outputs the communication media data received by the receiving unit, using an output method corresponding to the type request information received by the receiving unit;
   an operation detection unit that detects a specific user's operation for consenting to use the user-to-user communication means corresponding to the type request information received by the receiving unit;
   a data acquisition unit that stops a process of acquiring communication media data of a user of the communication terminal itself, corresponding to the type request information received by the receiving unit, until the specific user's operation is detected by the operation detection unit, and starts the process of acquiring communication media data of a user of the communication terminal itself, corresponding to the type request information received by the receiving unit, when the specific user's operation is detected by the operation detection unit; and
   a transmission unit that transmits type request information indicating a type of user-to-user communication means corresponding to the specific user's operation detected by the operation detection unit and communication media data acquired by the data acquisition unit, to the partner communication terminal.

15. A communication terminal comprising:
   an operation detection unit that detects a user's operation to the communication terminal itself;
   a data acquisition unit that generates terminal operation information indicating a type of the user's operation to be used for terminal operation communication and contents of the user's operation, on the basis of the user's operation which is detected by the operation detection unit, the terminal operation communication being communication performed between the communication terminal and a partner communication terminal based on the type of the user's operation and the contents of the user's operation; and
   a transmission unit that transmits, to a partner communication terminal, type request information and the terminal operation information generated by the data acquisition unit, the type request information indicating that communication being performed between the communication terminal and the partner communication terminal is the terminal operation communication.

16. The communication terminal according to claim 15, further comprising:
   a receiving unit that receives the type request information and terminal operation information; and
   a presentation processing unit that outputs presentation contents corresponding to contents of a user's operation indicated by the terminal operation information, using an output method corresponding to an operation type included in the terminal operation information.

* * * * *